United States Patent [19]
Nozaki

[11] Patent Number: 6,167,142
[45] Date of Patent: Dec. 26, 2000

[54] OBJECT MOVEMENT SIMULATION APPARATUS

[75] Inventor: Naoyuki Nozaki, Kawasaki, Japan

[73] Assignee: Fujitsu Limited, Kawasaki, Japan

[21] Appl. No.: 09/066,787

[22] Filed: Apr. 28, 1998

[30] Foreign Application Priority Data

Dec. 18, 1997 [JP] Japan .................................. 9-349403

[51] Int. Cl.⁷ ................................................... G06K 9/00
[52] U.S. Cl. ......................... 382/103; 382/106; 700/255; 345/419
[58] Field of Search ..................................... 382/103, 106, 382/154; 364/474.2; 395/90; 345/420, 424, 419, 509; 700/255

[56] References Cited

U.S. PATENT DOCUMENTS

| | | | |
|---|---|---|---|
| 5,313,201 | 5/1994 | Ryan | 340/961 |
| 5,689,437 | 11/1997 | Nakagawa | 364/514 |
| 5,761,391 | 6/1998 | Sato et al. | 395/90 |

FOREIGN PATENT DOCUMENTS

| | | |
|---|---|---|
| 1-193973 | 8/1989 | Japan . |
| 5-20403 | 1/1993 | Japan . |
| 7-134735 | 5/1995 | Japan . |
| 8-77210 | 3/1996 | Japan . |
| 9-27046 | 1/1997 | Japan . |

OTHER PUBLICATIONS

Y. Sato, et al., "An Efficient Collision Detection Algorithm and Its Application", *Lecture Papers of 13th Robotics Society of Japan*, pp. 373–374.

Lecture Papers of 51th National Meeting of Information Processing, pp. 53–54.

*Primary Examiner*—Bhavesh Mehta
*Attorney, Agent, or Firm*—Staas & Halsey LLP

[57] ABSTRACT

In an object movement simulation apparatus, a collision arithmetic unit performs arithmetic including a detection of two closest points in accordance with information representative of a plurality of objects. An image producing unit produces a three-dimensional image including a virtual object representative of a closest line coupling the two closest points to each other. The image producing unit produces the three-dimensional image, where a viewpoint is moved in a direction vertical to the closest line, looking at the viewpoint after a movement.

9 Claims, 27 Drawing Sheets

OBJECT MOVEMENT SIMULATION APPARATUS

BACKGROUND OF THE INVENTION

1. Field of the Invention

The present invention relates to an object movement simulation apparatus in which works, such as assembling of parts or components, confirming behavior of movable parts of an apparatus, are implemented by a simulation, such works being involved in a problem of collision (interference) between object-to-object.

2. Description of the Related Art

Recently, there are increased occasions in which a three-dimensional CAD system is used for a product design. However, in case of a product which consists of a lot of parts and is complicated in arrangement, an assembling work for assembling the product is also complicated, and thus there is such a fear that it is overlooked that an occurrence of a collision with other parts at the stage of a design disenables even a man of experience to assemble the product, or an occurrence of a collision of movable parts with other parts makes it difficult to perform a desired operation.

According to the conventional CAD system for a mechanism design, it is possible to arrange designed parts at optional positions and in figures as if a product has been apparently assembled. However, in order for confirmation of no overlooking as mentioned above, there is a need to actually manufacture the parts constituting the product or models of the parts by way of trial and to assemble the product.

In view of the foregoing, it is desired that a simulation apparatus, which is capable of performing a simulation as to whether a designed product can be actually assembled or disassembled, or whether a movable part can implement a desired movement without any collision with other parts, without actually manufacturing the product by way of trial, appears.

In order to inspect as to whether assembling and the like are possible through the simulation, generally, there is adopted a technology of searching a disassembling route involved in no occurrence of a collision starting from the state of a product after assembling, on the basis of information as to parts designed with the use of a three-dimensional CAD system (cf. for example, "GEOMETRIC REASONING ABOUT MECHANICAL ASSEMBLY, Randall H. Wilson Jean-Claude Latombe, Stanford University, Artifical Inteligence 71 (2), December 1994", and "AN EFFICIENT SYSTEM FOR GEOMETRIC ASSEMBLY SEQUENCE GENERATION AND EVALUATION, Bruce Romney, Stanford University, Proc. 1995 ASME. Int 1 Computers in Engineering Conf., pp.699–712).

A technology for performing a collision check to check as to whether there is any occurrence of a collision and also to determine collision points involved in an occurrence of the collision is proposed, for example, in Japanese Patent Application Laid Open Gazette Hei. 7-134735, Japanese Patent Application Laid Open Gazette Hei. 8-77210, Japanese Patent Application Laid Open Gazette Hei. 9-27046, "Lecture Papers of 13th Robotics Society of Japan, pp. 373–374", and "Lecture Papers of 51th National Meeting of Information Processing of Japan, pp. 53–54".

It is important for the simulation apparatus as mentioned above, form a viewpoint of being easy to do assembling and disassembling, to know the closest point between an object (part) now on translation and another object (part), as well as an inspection as to whether a collision occurs. Of the above-mentioned technology of collision check, there is a technology in accordance with which the closest point between object-to-object can be determined. The use of such a technology makes it possible to perform a translation (assembling, disassembling, etc.) simulation while confirming the existence of the closest point in such a manner that a virtual object indicative of the closest line coupling closest point-to-closest point, as well as an object (part) of interest of the translation simulation and objects (parts) existing around the object of interest, are disposed in a virtual three-dimensional space, so that a three-dimensional image, which is obtained when the virtual three-dimensional space is looked at from a certain viewpoint, is displayed on a display screen.

FIG. 34 is an explanatory view useful for understanding a movement simulation.

It is assumed that an object A, an object B and an object C are disposed in a virtual three-dimensional space, and the object A is translated along the arrow X.

At that time, at the respective positions (a, b, c, d and e show in FIG. 34) in the mid way of translation of the object A, a virtual object (hereinafter, it happens that the virtual object is referred to as a closest line without distinction between it and the closest line) representative of the closest line MAL coupling two closest points of a first closest point most closed to the object A on an object (in case of positions a–d, the object B; in case of position e, the object C) most closed to the object A, and a second closest point on the object A most closed to the first closest point is kept to display on a display screen always during a translation of the object A. This feature makes it possible to know a "margin" free from a collision of the object A under movement with other objects.

However, if this is simply implemented, it may happen that the closest line MAL disappears in the object.

FIGS. 35(A) and 35(B) and FIGS. 36(A) and 36(B) are typical illustrations each showing the manner in which the closest line disappears in the object. FIGS. 35(A) and 35(B) are concerned with the state before movement. FIGS. 36(A) and 36(B) are concerned with the state after translation. FIG. 35(A) and FIG. 36(A) are plan views. FIG. 35(B) and FIG. 36(B) are front views. It is assumed that the front views shown in FIG. 35(B) and FIG. 36(B) are displayed on a display screen, and the object A is translated along the arrow X shown in FIG. 35(A).

In the state before translation shown in FIGS. 35(A) and 35(B), the closest line MAL is indicated in not only the plan view shown in FIG. 35(A), but also the front view shown in FIG. 35(B). On the other hand, in the state after translation shown in FIGS. 36(A) and 36(B), while the closest line MAL is indicated in the plan view shown in FIG. 36(A), the closest line MAL disappears in FIG. 36(B) displayed on the display screen.

Thus, when the closest line MAL disappears, it is impossible to identify the "margin" free from a collision. Therefore, there is a need that a translation of an object is interrupted, three-dimensional images produced through altering a viewpoint are sequentially displayed to find a three-dimensional image easy to see the closest line, and then a translation of the object is resumed. Particularly, in the event that a large number of parts are assembled, when a closest line MAL is varied while a certain object is translated among a lot of parts, or when a closest line MAL disappears in various objects, there is a need to often repeat an interruption of a translation of an object, an alteration of the viewpoint, and a resumption of the translation. This involves a troublesomeness in operation.

In order to solve such a troublesomeness in operation, it is considered that an object on a three-dimensional image is displayed with a line drawing such as a wire frame, etc. However, in the event that a plurality of objects are overlapped, lines are congested, and as a result it is considered that it would bring about an image which is difficult to intuitively grasp an arrangement relation among objects and a closest-point relation between objects.

The foregoing problems are similar in the matter of a collision point in the event that a collision occurs. Also in this case, it is considered that the collision point disappears in objects, and in the event that an object is displayed with a line drawing, it is considered that it would bring about an image which is difficult to intuitively grasp an arrangement relation among objects and a closest-point relation between objects.

SUMMARY OF THE INVENTION

In view of the foregoing, it is therefore an object of the present invention to provide an object movement simulation apparatus capable of displaying a three-dimensional image in which a closest point and a collision point are easy to see, and a position relation among objects can be easily grasped.

FIG. 1 is a schematic diagram showing a functional structure of an object movement simulation apparatus according to an embodiment of the present invention.

The object movement simulation apparatus according to the present invention comprises collision arithmetic means 100 and image producing means 200. Likely, the first to fourth object movement simulation apparatuses, which will be described hereinafter, also basically has collision arithmetic means 100 and image producing means 200.

The collision arithmetic means 100 performs arithmetic including a detection of two closest points in accordance with information (object information) representative of a plurality of objects, among an object of interest of anyone of the plurality of objects and other objects excepting the object of interest, said two closest points consisting of a closest point on a closest object located closest to the object of interest with respect to the object of interest, and a closest point on the object of interest with respect to the closest object.

The image producing means 200 produces a three-dimensional image including a virtual object representative of a closest line coupling the two closest points to each other.

Of the object movement simulation apparatus according to the present invention having the basic structure as mentioned above, the first object movement simulation apparatus is characterized in that said image producing means 200 produces the three-dimensional image, where a viewpoint is moved in a direction vertical to the closest line, looking at the viewpoint after a movement.

Usually, in the event that the closest line is looked at the side, the closest line can be visually recognized in the best way. Further, in the event that the closest line is looked at the side, a possibility that the closest line is interrupted by objects is low. Thus, also in this respect, the aspect of the first object movement simulation apparatus may contribute to a good visibility for the closest line.

In the first object movement simulation apparatus, it is preferable that said image producing means 200 produces three-dimensional images for a plurality of objects after movement including the virtual object representative of a closest line after movement, where before and after a noticed movement of the object of interest now on movement, a perpendicular line is put down from a viewpoint before movement on a plane passing through a mid-point of the closest line after movement, said closest line being defined as a normal, and the viewpoint is moved from the mid-point on a straight line directed toward a point at which the perpendicular line intersects the plane, looking at the viewpoint after movement.

There is a fear that a large variation of a viewpoint brings about taking time for interpreting an arrangement relation among a plurality of objects. The above-mentioned feature of the first object movement simulation apparatus makes it possible to easy to understand the arrangement relation among a plurality of objects.

In the first object movement simulation apparatus, it is also preferable that said image producing means produces three-dimensional images for a plurality of objects after movement including the virtual object representative of a closest line after movement, where before and after a noticed movement of the object of interest now on movement, a viewpoint is moved on a plane passing through a mid-point of the closest line after movement, said closest line being defined as a normal, to a point at which an area that the virtual object representative of the closest line after movement is interrupted by objects appearing on the three-dimensional images is relatively small or, alternatively such a probability is high, looking toward the closest line after movement at the viewpoint after movement.

This feature makes it possible to enhance a possibility of a good visibility for the closest line, although there is a fear that a large variation of a viewpoint brings about taking time for interpreting an arrangement relation among a plurality of objects.

Of the object movement simulation apparatus according to the present invention, the second object movement simulation apparatus, having the basic structure as mentioned above, is characterized in that said image producing means 200 produces the three-dimensional image in which a semitransparency-placing processing is applied to objects which interrupt the virtual object representative of the closest line.

The semitransparency-placing processing means a scheme in which an object or part of the object, which hides behind one's own, or an object or part of the object, which is included inside one's own, and one's own self are displayed with a clear distinction between one's own self and those objects, for example, in such a manner that an object or part of the object, which hides behind one's own, or an object or part of the object, which is included inside one's own, are expressed with a mixed color of the color of the object with the color of one's own.

According to the second object movement apparatus, there is produced the three-dimensional image in which a semitransparency-placing processing is applied to objects which interrupt the virtual object representative of the closest line. Thus, it is possible to maintain a good visibility for an arrangement relation among objects.

Of the object movement simulation apparatus according to the present invention, the third object movement simulation apparatus, having the basic structure as mentioned above, is characterized in that said image producing means produces the three-dimensional image in which an object, which interrupts the virtual object representative of the closest line, is non-displayed in at least part interrupting the virtual object.

This feature makes it possible to secure a good visibility for an arrangement relation between the object of interest and the closest line coupled with each other, at least in parts coupled by the closest line.

In the third object movement simulation apparatus, it is acceptable that said image producing means 200 produces three-dimensional images in which with respect to a direction along eyes looking toward the virtual object representative of the closest line, an object or a part of the object, which is located at this side of the virtual object, is non-displayed, alternatively, it is acceptable that said image producing means produces three-dimensional images in which an object or a part of the object, which is located in a space defined by two planes expanding along eyes looking the virtual object representative of the closest line, the virtual object being interposed between the two planes, is non-displayed.

Of the object movement simulation apparatus according to the present invention, the fourth object movement simulation apparatus, having the basic structure as mentioned above, is characterized in that collision arithmetic means 100 performs arithmetic in accordance with information representative of a plurality of objects, among an object of interest of anyone of the plurality of objects and other objects excepting the object of interest, said arithmetic including a detection of occurrence of a collision, a detection, concerning occurrence of a collision, of a collision point between the object of interest and a collision object collided with the object of interest, and a detection, concerning non-occurrence of a collision, of two closest points consisting of a closest point on a closest object located closest to the object of interest with respect to the object of interest, and a closest point on the object of interest with respect to the closest object;

image producing means 200 produces three-dimensional images of a plurality of objects including the object of interest and the closest object or the collision object, while said collision arithmetic means performs the arithmetic as the object of interest moves, wherein in case of the non-occurrence of a collision, the three-dimensional images including a virtual object representative of a closest line coupling the two closest points to each other are sequentially produced;

image display means displays the three-dimensional images produced in said image producing means; and said image producing means produces a three-dimensional image including a semitransparent sphere permitted in overlapping with another object on a collision point in a case where an occurrence of a collision is detected by said collision arithmetic means.

The "semitransparent sphere" means a sphere which is subjected to the above-mentioned "semitransparency-placing processing". This sphere is permitted in overlapping with another object. Thus, an object, which overlaps with this sphere (included in the sphere), or part of the object, may be displayed through the semitransparent sphere.

Displaying the semitransparent sphere makes it possible to easily identify the position of the collision point.

In the fourth object movement simulation apparatus, it is preferable that said image producing means 200 produces three-dimensional images in which a semitransparency-placing processing is applied to objects which interrupt the collision point.

This feature makes it possible to maintain a good visibility of an arrangement relation between objects and also to visually recognize a collision point.

In the fourth object movement simulation apparatus, it is also preferable that said image producing means 200 produces three-dimensional images in which an object, which interrupts the collision point, is non-displayed in at least part interrupting the collision point.

This feature makes it possible to ensure an observation of collision points, and to ensure a good visibility in a position relation between an object of interest involved in a collision and a collision object in connection with at least part near the collision point.

Further, in the fourth object movement simulation apparatus, it is also preferable that the apparatus further comprises alarm sound generating means 300 for generating alarm sound indicating an occurrence of a collision when said collision arithmetic means 100 detects an occurrence of a collision.

The use of the alarm sound generating means 300 makes it possible to remarkably reduce a possibility that an occurrence of a collision goes unrecognized.

DESCRIPTION OF THE PREFERRED EMBODIMENTS

Hereinafter, there will be described embodiments of the present invention.

Figure 1:
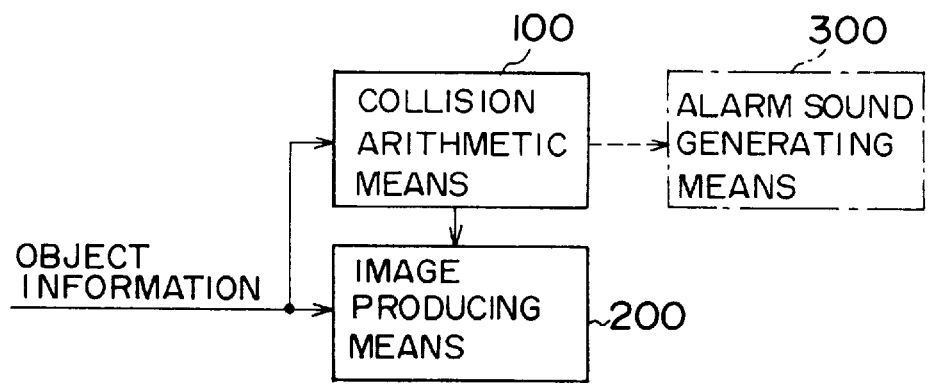
FIG. 1 is a schematic diagram showing a functional structure of an object movement simulation apparatus according to an embodiment of the present invention.
Figure 2:
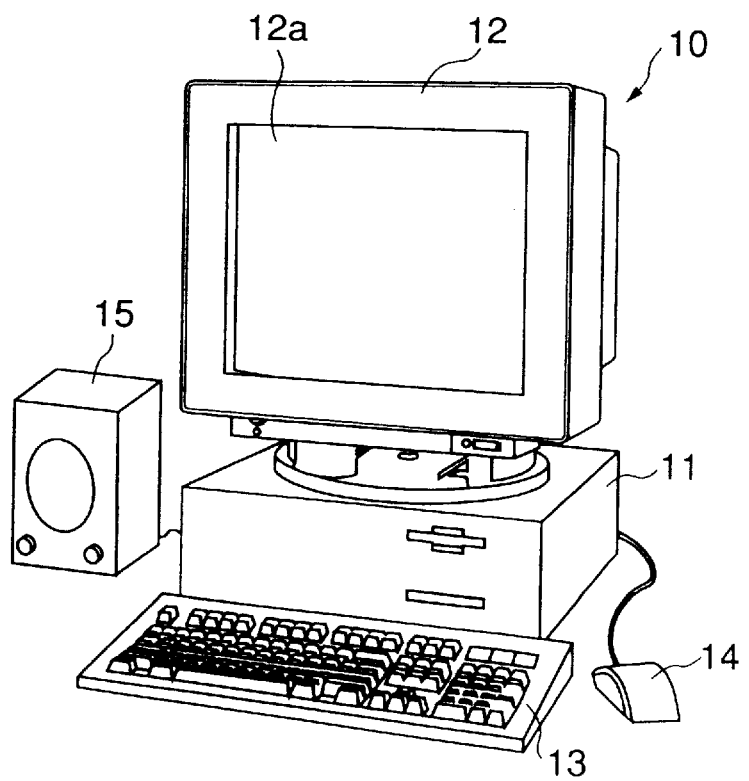
FIG. 2 is a perspective illustration of an object movement simulation apparatus according to an embodiment of the present invention.

FIG. 2 is a perspective illustration of an object movement simulation apparatus according to an embodiment of the present invention.

As shown in FIG. 2, the object movement simulation apparatus according to an embodiment of the present invention is implemented by a computer system 10. The computer system 10 comprises: a main frame 11 which incorporates thereinto a CPU, a magnetic disk, etc.; an image display unit 12 for displaying images on a display screen 12a; a keyboard 13 for an input operation, a mouse 14 which serves as an handler for applying various types of instruction to the computer system 10 through optionally designating a position on the display screen 12a; and a speaker 15 for generating alarm sound which will be described later. The main frame 11 of the computer system 10 further incorporates: thereinto a 3D plotting unit which serves as a tool for plotting at high speed a three-dimensional image displayed on the display screen 12a of the image display unit 12; a speech generation unit for generating speech emanated from the speaker; a floppy disk driver for accessing a floppy disk loaded; and a CD-ROM driver for accessing a CD-ROM loaded.

Figure 3:
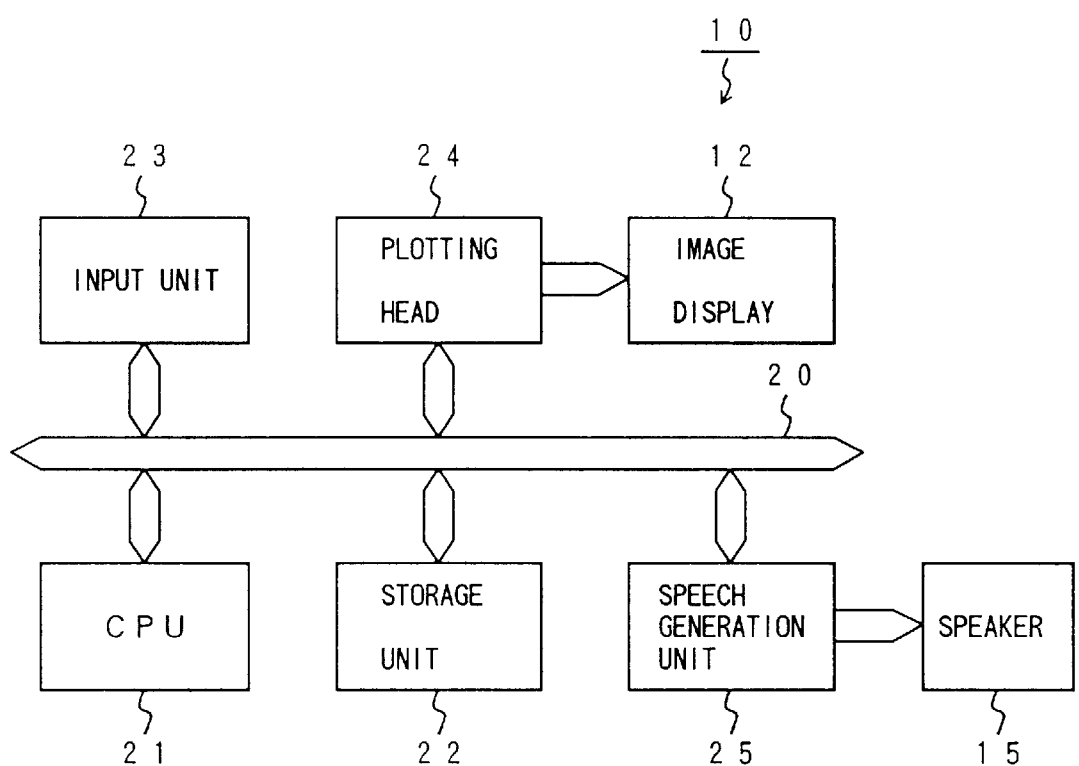
FIG. 3 is a schematic diagram showing an internal structure of a computer system.

FIG. 3 is a schematic diagram showing an internal structure of the computer system 10 shown in FIG. 2. In FIG. 3, there are shown only structural components which are essentially necessary for implementing the object movement simulation apparatus according to an embodiment of the present invention.

The internal structure of the computer system 10, which is shown in FIG. 3, comprises: a CPU 21 for performing arithmetic in accordance with a program; a storage unit 22 for storing therein a program for causing the CPU 21 to perform arithmetic, and information defining figures, positions and attitudes of various objects in a virtual three-dimensional space constructed in the computer system 10, the storage unit 22 being permitted in overwrite; an input unit 23 consisting of the keyboard 13, the mouse 14, etc., as shown in FIG. 2; a 3D plotting unit 24 for plotting at high speed a three-dimensional image to be displayed on the image display unit 12 in accordance with object information; and a speech generation unit 25 for generating a speech to be emanated from the speaker 15 and enabling the speaker. Those components are connected to each other via a bus 20.

Hereinafter, there will be described a program for implementing the object translation simulation apparatus according to an embodiment of the present invention, the program being stored in the storage unit 22 and executed in the CPU 21.

Figure 4:
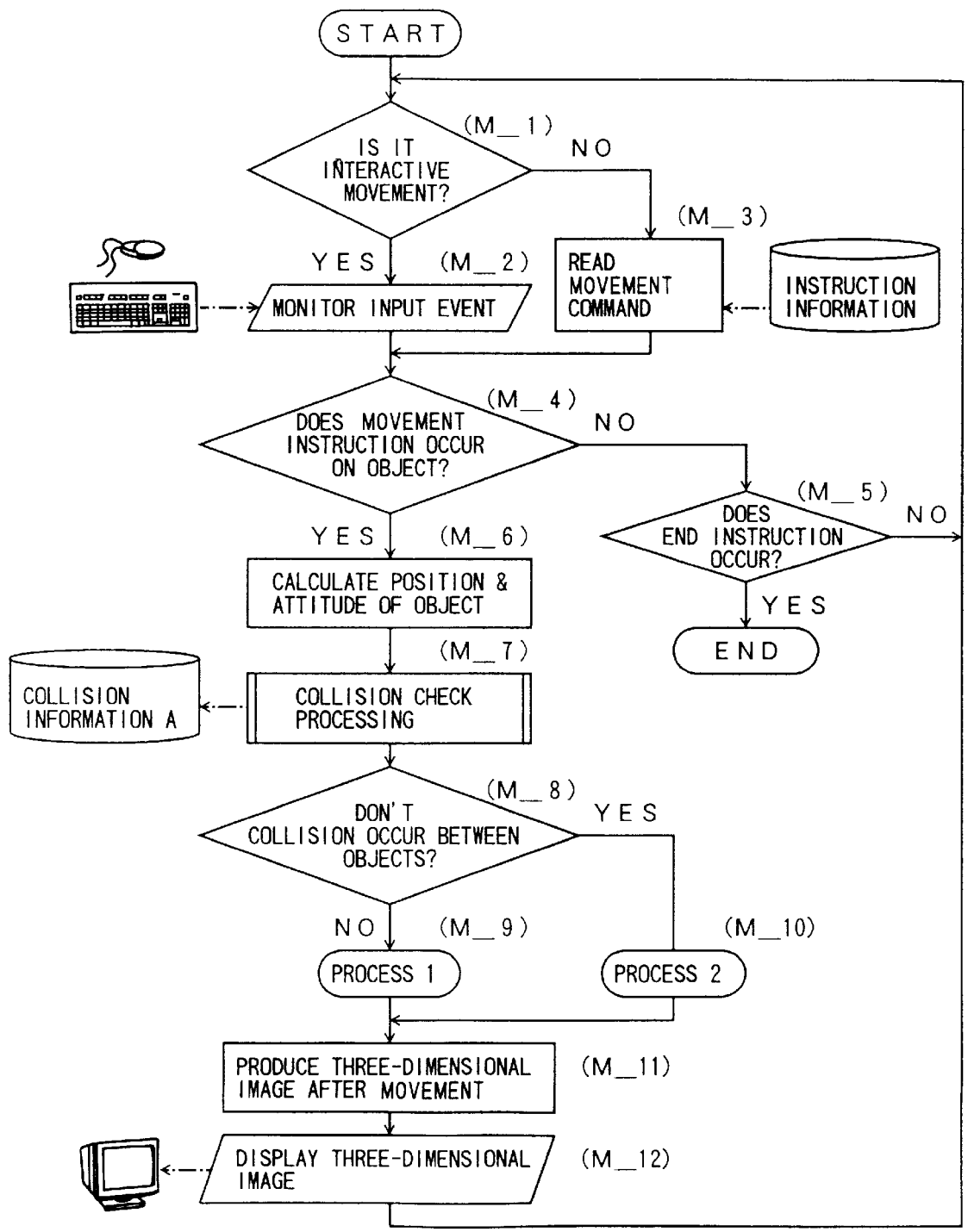
FIG. 4 is a flowchart of a main routine.

FIG. 4 is a flowchart of a main routine.

In a step M_1, it is determined whether an object (referred to as an "object of interest"), which is intended to be moved (including not only a movement of positions, but also an alteration of attitudes), of a plurality of objects disposed in a virtual three-dimensional space constructed in the computer system is translated in accordance with instruction information stored in the storage beforehand, or the object of interest is interactively translated in accordance with instruction information inputted by an instruction operation through the input unit. With respect to an optional selection between those instruction modes, it is inputted in the form of instruction by an operator of the computer system so as to be stored therein in the form of a flag. Thus in the step M_1, the determination is performed in accordance with the flag without being referred to the operator each time it happens.

It is assumed that the instruction information consists of messages set forth in Table 1.

TABLE 1

| NAMES | CONTENTS |
|---|---|
| OBJECT | OBJECT IDENTIFIER FOR SPECIFYING OBJECT OF INTEREST |
| INSTRUCTION CONTENTS | TRANSLATION, ROTATION, etc. |
| ARGUMENTS | FOR EXAMPLE, IN CASE OF TRANSLATION, TRANSLATION Δx (x1, y1, z1), etc. |

It is noted that the "object identifier" implies an identifier defined for each object for identifying an object. and the "translation" implies a movement (in the narrow sense) of a position of an object in the virtual three-dimensional space. As mentioned above, the "movement" is in the broad sense a concept including a rotation of an object. Hereinafter, the movement in the narrow sense is referred to as the "translation", and the "movement" is taken in the broad sense unless it is contrary to the nature.

In the step M_1, when it is determined that it is an interactive movement, the process goes to a step M_2 in which an input event is monitored, and when the input event occurs, the process goes to a step M_4.

On the other hand, in the step M_1, when it is determined that it is not an interactive movement, the process goes to a step M_3 in which instruction information, which has been prepared beforehand in the storage unit, is read and then the process goes to a step M__4. On the occasion of reading the instruction information from the storage unit, a lot of pieces of instruction information is prepared beforehand in the storage unit during a movement of the object of interest. The instruction information includes instruction information as to an instruction of termination of the movement as well as instruction information as to an instruction of the movement of objects shown in Table 1.

In the step M__4, it is determined as to whether the instruction information now entered or now read is concerned with an instruction of the movement of objects, and if it is not concerned with an instruction of the movement of objects, the process goes to a step M__5 in which it is determined as to whether the instruction information now entered or now read is concerned with an instruction of termination of the movement of objects, and if it is concerned with an instruction of termination of the movement of objects, the routine is terminated. And if it is not concerned with an instruction of termination of the movement of objects, the process returns to the step M__1.

In the step M__4, it is determined as to whether the instruction information now entered or now read is concerned with an instruction of the movement of objects, and if it is concerned with an instruction of the movement of objects, the process goes to a step M__6 in which position and attitude of the object of interest after the movement is calculated on the basis of the present instruction information. And in a step M__7, a collision check processing between the object of interest after the movement and another object is performed.

The collision check processing adopts the collision check processing algorithm well known which is described in the above-mentioned references. Since the algorithm is well known per se, the explanation will be omitted.

In the collision check processing, collision information shown in Table 2 set forth below is determined, and the collision information thus obtained is stored in the storage unit.

TABLE 2

| NAMES | CONTENTS |
| --- | --- |
| DISTANCE | DISTANCE BETWEEN CLOSEST POINTS |
| COLLISION | COLLISION/NO COLLISION |
| CLOSEST POINTS | TWO POINTS OF VIRTUAL SPACE: X1 (x1, y1, z1), X2 (x2 y2, z2) |
| (COSSISION POINTS) | CASE OF OCCURRENCE OF COLLISION (COLLISION POINT): X1 = X2 |

The closest points mean two points: a point closest to the object of interest on the closest object closest to the object of interest now moved; and a point closest to the closest object on the object of interest. The collision point means a collision point of the object of interest with a collision object collided with the object of interest.

In a step M__8, it is determined as to whether a collision occurs in accordance with the collision information obtained in the step M__7, and if it is determined that the collision occurs does not occur, then the process goes to a step M__9 in which a process 1 is performed. On the other hand, if it is determined that the collision occurs, then the process goes to a step M__10 in which a process 2 is performed. Details of the process 1 and the process 2 will be described later.

Thereafter, the process goes to a step M__11 in which there is produced a three-dimensional image after a movement of the object of interest, and then the process goes to a step M__12 in which the three-dimensional image is displayed on the image display unit.

Figure 5:
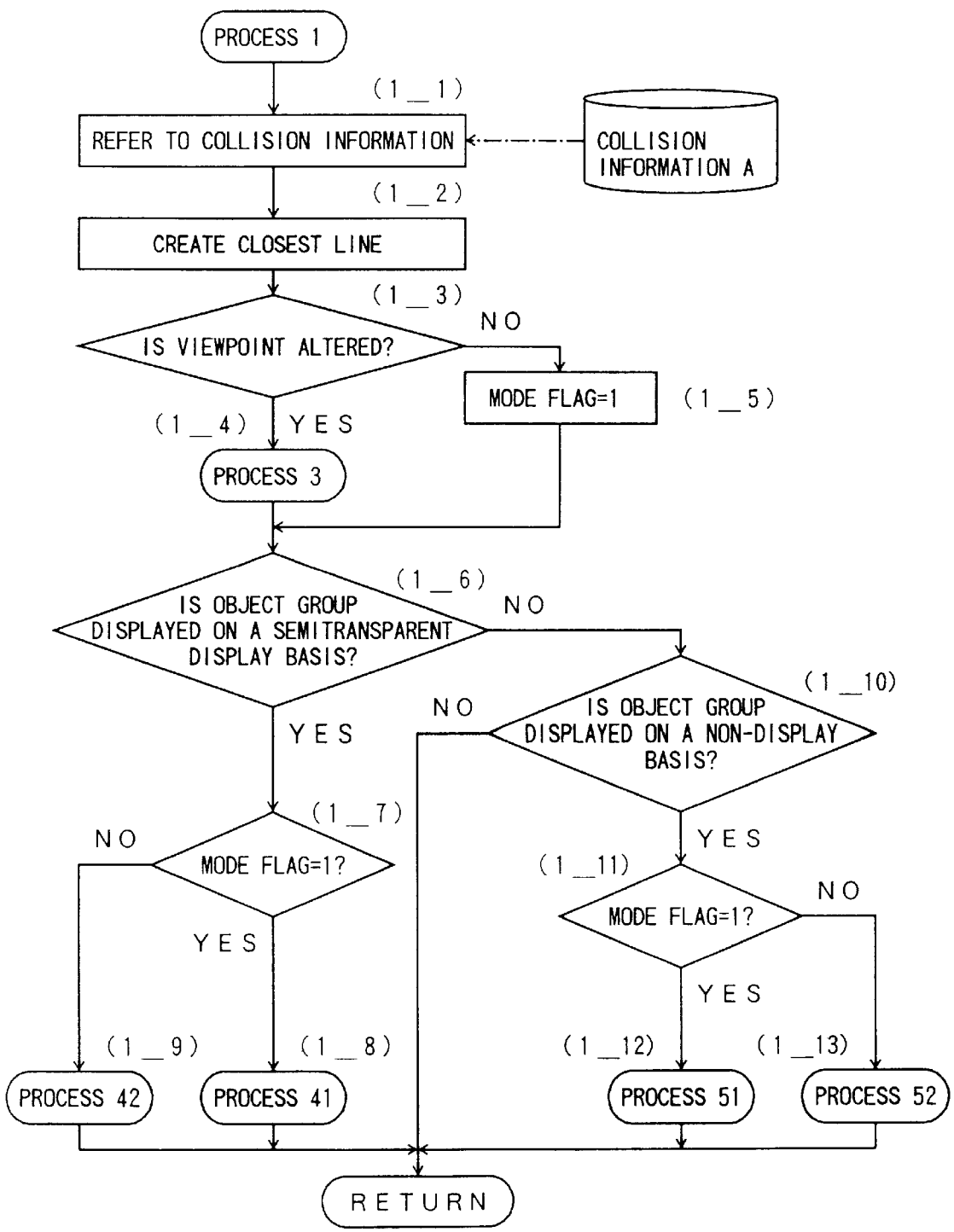
FIG. 5 is a flowchart of a routine for process 1.

FIG. 5 is a flowchart of a routine for the process 1. The routine for the process 1 is concerned with a process in the step M__9 which is performed when no collision occurs, in the main routine shown in FIG. 4.

In a step 1__1, collision information (cf. Table 2), which is determined in the step M__7 of the main routine shown in FIG. 4 and stored in the storage unit, is referred to, and in a step 1__2 in which a closest line coupling two closest points with each other is produced in accordance with the collision information.

In step 1__3, it is determined whether an alteration of a viewpoint is instructed. While the instruction of an alteration of a viewpoint is performed by an operator of the computer system, once such an instruction is performed, it is stored in the form of a flag. In the step 1__3, the determination is performed referring to the flag. It is permitted to alter the flag in the middle of a movement simulation of the object.

When an alteration of the viewpoint is instructed, the process goes to a step 1__4 in which a process 3 is performed. Details of the process 3 will be described later.

When the process 3 is terminated, the process goes to a step 1__6 in which it is determined whether an object group is displayed on a semitransparent display basis. In the step 1__3, when it is determined that an alteration of a viewpoint is not instructed, the process goes to a step 1__5 in which a mode flag ModeFlag is set to 1 and then the step 1__6. The meaning of the mode flag ModeFlag will be described later. The object group referred to in the step 1__6 means a set of objects blocking the closest line, defined in the manner as will be described later, but does not mean all of the objects. The determination in the step 1__6 is performed also in accordance with a flag inputted beforehand through an instruction, in a similar fashion to that of the determination of the alteration of the viewpoint in the step 1__3.

In the step 1__6, when it is indicated that the object group is displayed on a semitransparent display basis, the process goes to a step 1__7 in which it is determined whether the mode flag ModeFlag is set up to 1. When it is determined that the mode flag ModeFlag is set up to 1, the process goes to a step 1__8 in which a process 41 is performed, and when ModeFlag≠1, the process goes to a step 1__9 in which a process 42 is performed. Details of the process 41 and the process 42 will be described later. When the process 41 or the process 42 is terminated, the process goes to the step M__11 of the main routine shown in FIG. 4, in which the three-dimensional image is produced.

In the step 1__6, it is determined that it is not indicated that an object group is displayed on a semitransparent display basis, the process goes to a step 1__10 in which it is determined that the object group is displayed on a non-display basis. The object group referred to here means a set of objects or parts of the objects blocking the closest line, defined in the manner as will be described later. The determination in the step 1__10 is performed also in accordance with a flag inputted beforehand through an instruction, in a similar fashion to that of the determination as to the semitransparent display in the step 1__6.

In the step 1__10, when it is determined that the object group is displayed on a non-display basis, the process goes to a step 1__11 in which it is determined whether the mode flag ModeFlag is set up to 1. When ModeFlag=1, the process goes to a step 1__12 in which a process 51 is performed. When ModeFlag≠1, the process goes to a step 1__13 in which a process 52 is performed. Details of the process 51 and the process 52 will be described later. When the process 51 or the process 52 is terminated, the process goes to the step M_11 of the main routine shown in FIG. 4, in which the three-dimensional image is produced.

In the step 1_10, when it is determined that it is not instructed that the object group is displayed on a non-display basis, the process goes to the step M_11 of the main routine shown in FIG. 4.

Figure 6:
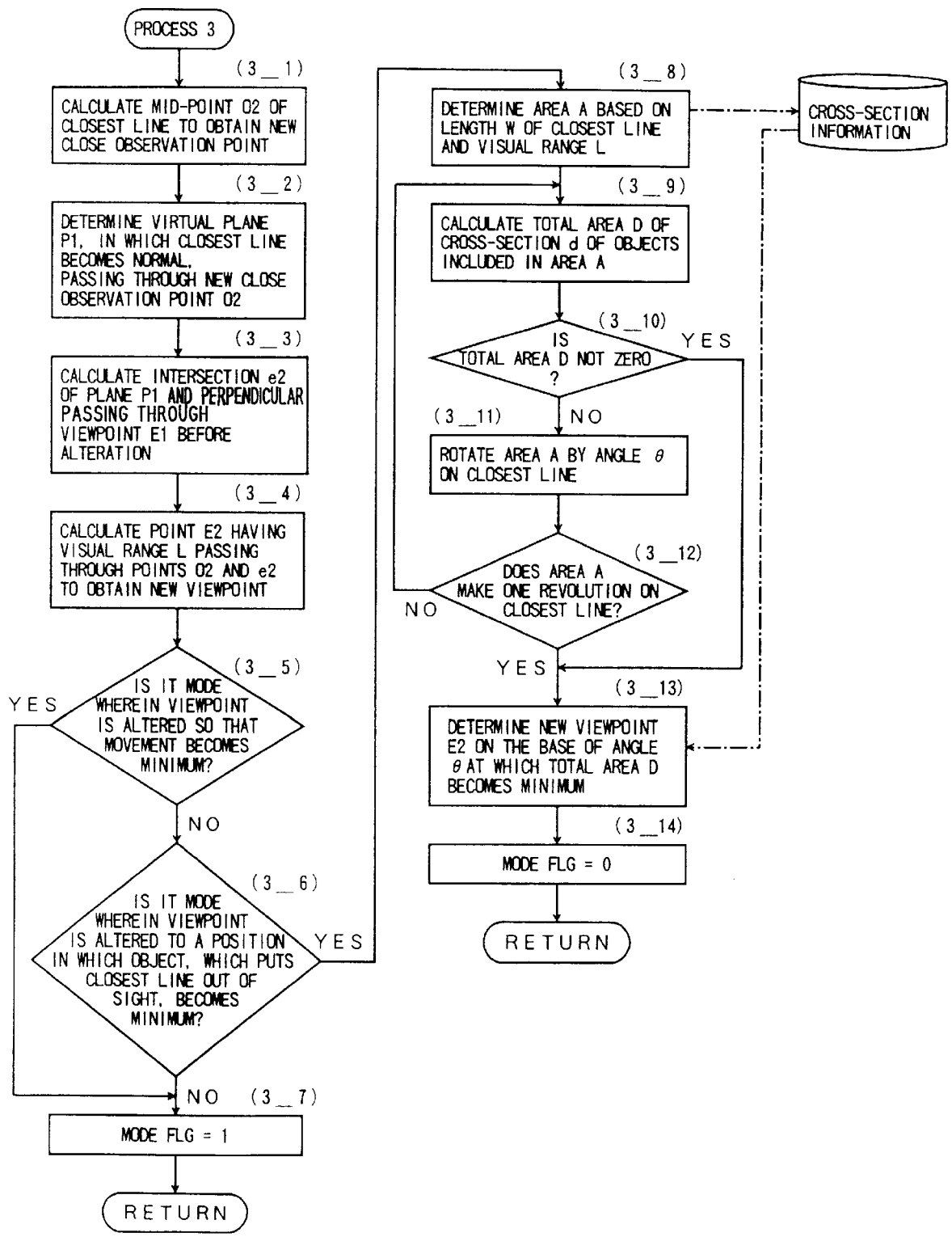
FIG. 6 is a flowchart of a routine for process 3.

FIG. 6 is a flowchart of a routine for the process 3 which is performed in the step 1_4 of the routine for the process 1 shown in FIG. 5. The routine for the process 1 shown in FIG. 5 is performed when it is determined that no collision occurs between objects in the step M_8 of the main routine shown in FIG. 4. The routine for the process 3 shown in FIG. 6 is performed when it is determined in the step 1_3 of the routine for the process 1 that a viewpoint is altered. That is, the routine for the process 3 is for altering a viewpoint to improve a visibility of the closest line in the event that the closest line is displayed under such a condition that no collision occurs and whereby the closest line may be produced.

Prior to the explanation of the routine for process 3 shown in FIG. 6, there will be explained a relation between an object disposed in a virtual three-dimensional space and a three-dimensional image giving a picture of the object.

Figure 7:
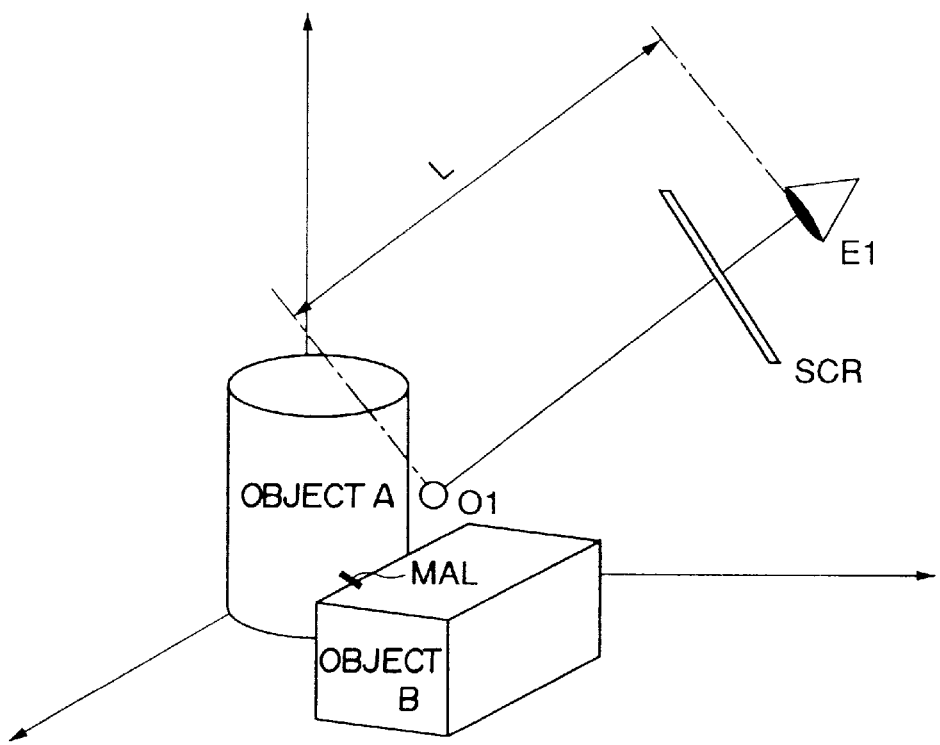
FIG. 7 is a typical illustration showing a state that a plurality of objects are disposed in a virtual three-dimensional space.
Figure 8:
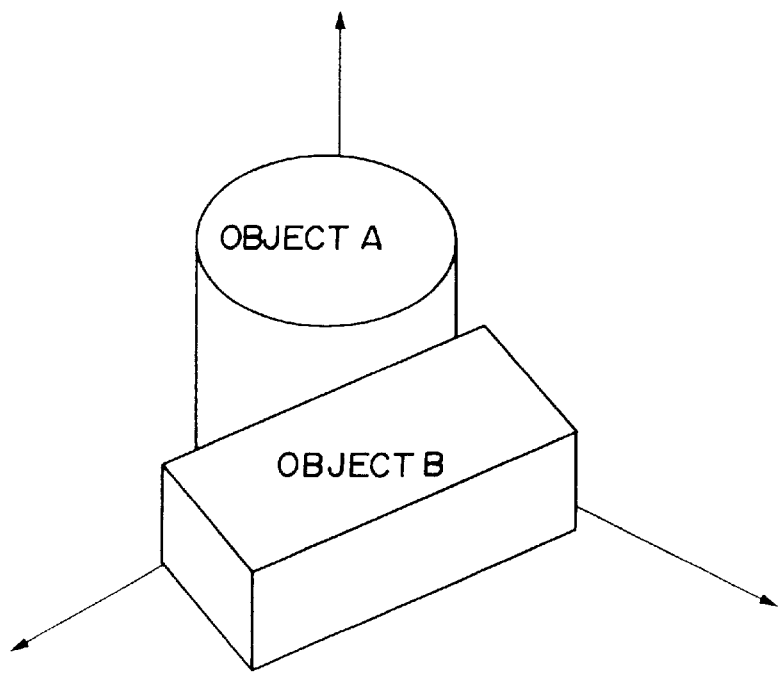
FIG. 8 is a typical illustration showing a three-dimensional image depicting a plurality of objects disposed in a virtual three-dimensional space.

FIG. 7 is a typical illustration showing a state that a plurality of objects are disposed in a virtual three-dimensional space. FIG. 8 is a typical illustration showing a three-dimensional image depicting the plurality of objects disposed in the virtual three-dimensional space.

As shown in FIG. 7, two objects A and B are disposed in a three-dimensional space, and there is shown the closest line MAL between the objects A and B. To produce a three-dimensional image of the objects A and B, a viewpoint E1 and a close observation point 01 are defined. The three-dimensional image is depicted by an image obtained when looking at the close observation point 01 from the viewpoint E1 through a screen SCR. According to this example, the associated three-dimensional image is given with an image as shown in FIG. 8. In the three-dimensional image shown in FIG. 8, the closest line MAL disappear in the object B and is not displayed. A distance L between the viewpoint E1 and the close observation point 01 is referred to as a visual range. Incidentally, looking at the objects A and B from the viewpoint E1 through the screen SCR may obtain a three-dimensional image based on the laws of perspective. It is acceptable that the laws of perspective is adopted to produce the three-dimensional image. However, there is no need to always adopt the laws of perspective, and it is acceptable to produce a three-dimensional image by adopting another way of depiction, for example, a three-dimensional image projected in parallel to a direction toward from the viewpoint E1 to the close observation point 01.

In the above-mentioned situation, it is assumed that the movement of the object A causes the closest line MAL to disappear as shown in FIG. 8. Hereinafter, there will be explained, by way of example, cases in which a viewpoint is altered in this condition.

Figure 9:
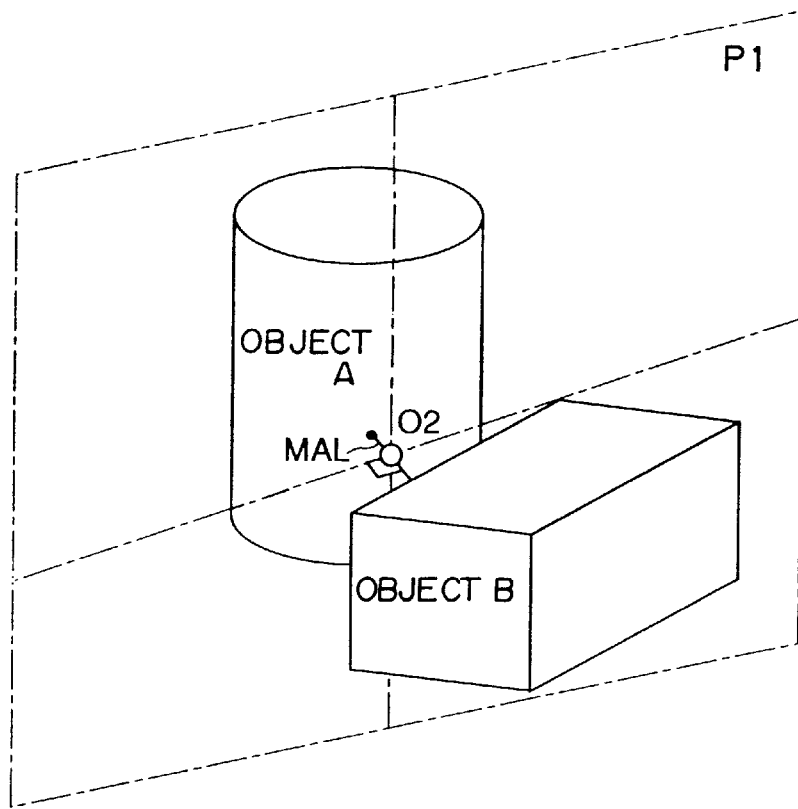
FIG. 9 is a typical illustration showing objects A and B having the same position relation as the objects A and B shown in FIG. 7.
Figure 10:
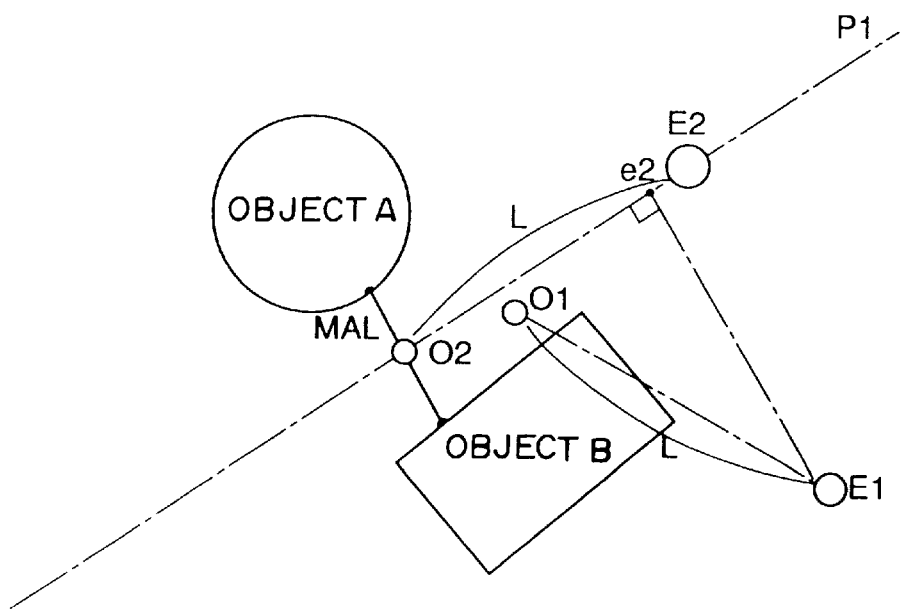
FIG. 10 is a plan view looking from a direction in which a plane P1 shown in FIG. 7 looks like a straight line.

FIG. 9 is a typical illustration showing objects A and B having the same position relation as the objects A and B shown in FIG. 7. FIG. 10 is a plan view looking from a direction in which a plane P1 shown in FIG. 9 looks like a straight line.

Figure 11:
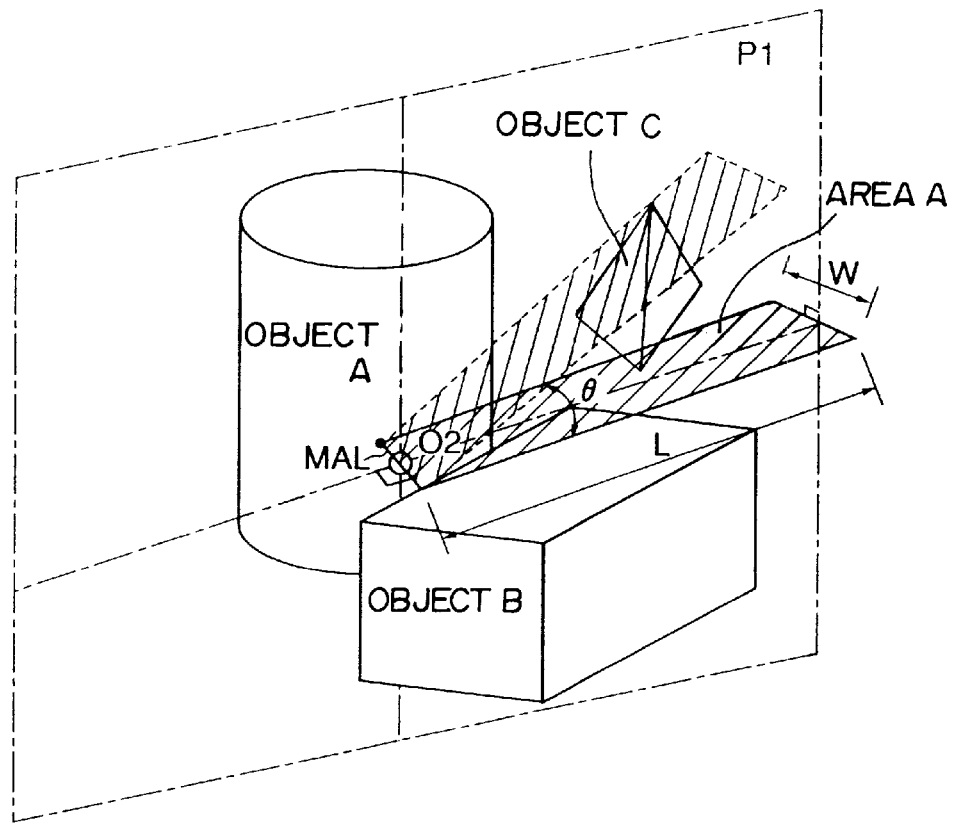
FIG. 11 is a typical illustration showing objects A and B having the same position relation as those shown in FIG. 9, and in addition an object C.
Figure 12:
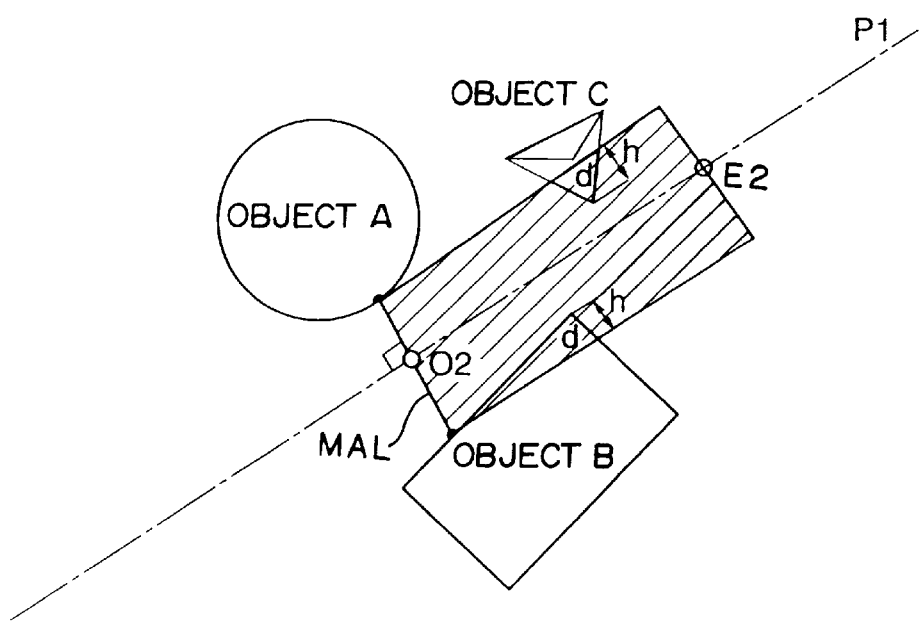
FIG. 12 is a plan view looking from a direction in which a plane P1 shown in FIG. 11 looks like a straight line.

FIG. 11 is a typical illustration showing objects A and B having the same position relation as those shown in FIG. 9, and in addition an object C. FIG. 12 is a plan view looking from a direction in which a plane P1 shown in FIG. 11 looks like a straight line.

Hereinafter, there will be explained the routine for the process 3 shown in FIG. 6 referring to FIGS. 9–12.

In the process 3 shown in FIG. 6, first, in a step 3_1, a mid-point 02 (cf. FIG. 9) of the closest line MAL is computed to define the mid-point 02 as a new close observation point. Next, in a step 3_2, there is determined a virtual plane P1, in which the closest line MAL becomes a normal, passing through the new close observation point.

Next, in a step 3_3, there is computed an intersection e2 of a perpendicular line to a plane P1, passing through a viewpoint E1 before alteration, and the plane P1, shown in FIG. 10. Then, the process goes to a step 3_4 in which there is computed a point E2 having a visual range L passing through two points 02 and e2 and extending from the close observation point 02 to the point e2, and the point E2 is defined as a new viewpoint.

According to the present embodiment, there is so arranged that either one of two modes, that is, a mode in which a viewpoint is altered in such a manner that a movement of the viewpoint becomes a minimum, and another mode wherein a viewpoint is altered to a position in which an object, which puts the closest line out of sight, becomes a minimum, is selected beforehand. In a step 3_5, it is determined whether it is a mode wherein a viewpoint is altered in such a manner that a movement of the viewpoint becomes a minimum. In a step 3_6, it is determined whether it is a mode wherein a viewpoint is altered to a position in which an object, which puts the closest line out of sight, becomes a minimum. In the event that the mode is not explicitly designated, according to the present embodiment, there is adopted the mode wherein a viewpoint is altered in such a manner that a movement of the viewpoint becomes a minimum.

When there is adopted the mode wherein a viewpoint is altered in such a manner that a movement of the viewpoint becomes a minimum, the process goes to a step 3_7 in which a mode flag ModeFlag is set up to '1' and then the process goes to the step 1_6 shown in FIG. 5.

In the step 3_6, when it is determined that there is designated the mode wherein a viewpoint is altered to a position in which an object, which puts the closest line out of sight, becomes a minimum, the process goes to a step 3_8 in which there is determined a plane area A shown in FIG. 11, that is, a rectangular area A, on the basis of a length L of the closest line MAL and the visual range L. In a step 3_9, there is computed a total area D of cross-section area d of objects included in the area A. The total area D thus obtained is stored in a storage unit. This storage unit stores therein further identifiers of the objects included in the area A, and a rotational angle θ of the the area A, which will be described below. Here, those data are comprehensively referred to as "cross-section information".

Table 3 shows an example of the cross-section information.

TABLE 3

| ANGLE (θ) | TOTAL AREA D | OBJECT IDENTIFIER (1) | CROSS-SECTION d |
|---|---|---|---|
| 15° | 45 | 0 | 10 |
|  |  | 2 | 25 |
|  |  | 4 | 15 |

In a step 3__10, it is determined whether the total area is not zero, or whether there exists an object which interrupts in view the closest line MAL. When it is decided that there exists an object which interrupts in view the closest line MAL, the process goes to a step 3__11 in which as shown in FIG. 11, the area A is rotated by a predetermined angle on the closest line. In a step 3__12, it is determined whether the area A makes one revolution. When it is decided that the area A does not make one revolution, the process returns to the step 3__9 in which there is computed a total area D of cross-section area d of objects included in the area A after the revolution.

In a step 3__13, when the total area D is not zero at any rotational angle, there is determined a new viewpoint E2 on the basis of an angle θ at which the total area D becomes minimum, referring to the total area D for each rotational angle θ, included in the cross-section information stored in the storage unit. In the step 3__10, when it is decided that the total area D is zero at some rotational angle, in the step 3__13 the new viewpoint E2 is computed on the basis of the rotational angle.

In a step 3__14, a mode flag ModeFlag is reset to zero. Here, the total area D of the cross-section area d of objects included in the area A is determined. The reason why this is to do so is that the cross-section area d is easy to compute. When the total area D of the cross-section area d is small, there is a high probability that the closest line is visible well.

While an amount of computation is increased, it is acceptable that as shown in FIG. 12, there is adopted instead of the cross-section area d a length h involved in inroads of an object into the area A, to determine an interrupted length of the closest line when looking at from the viewpoint E2. In this case, it is possible to determine a viewpoint at the rotational angle in which the closest line is visible in the best way.

In the process 3 of the step 1__4 in the routine of the process 1 shown in FIG. 5, an alteration of the viewpoint is performed in the manner as mentioned above.

Figure 13:
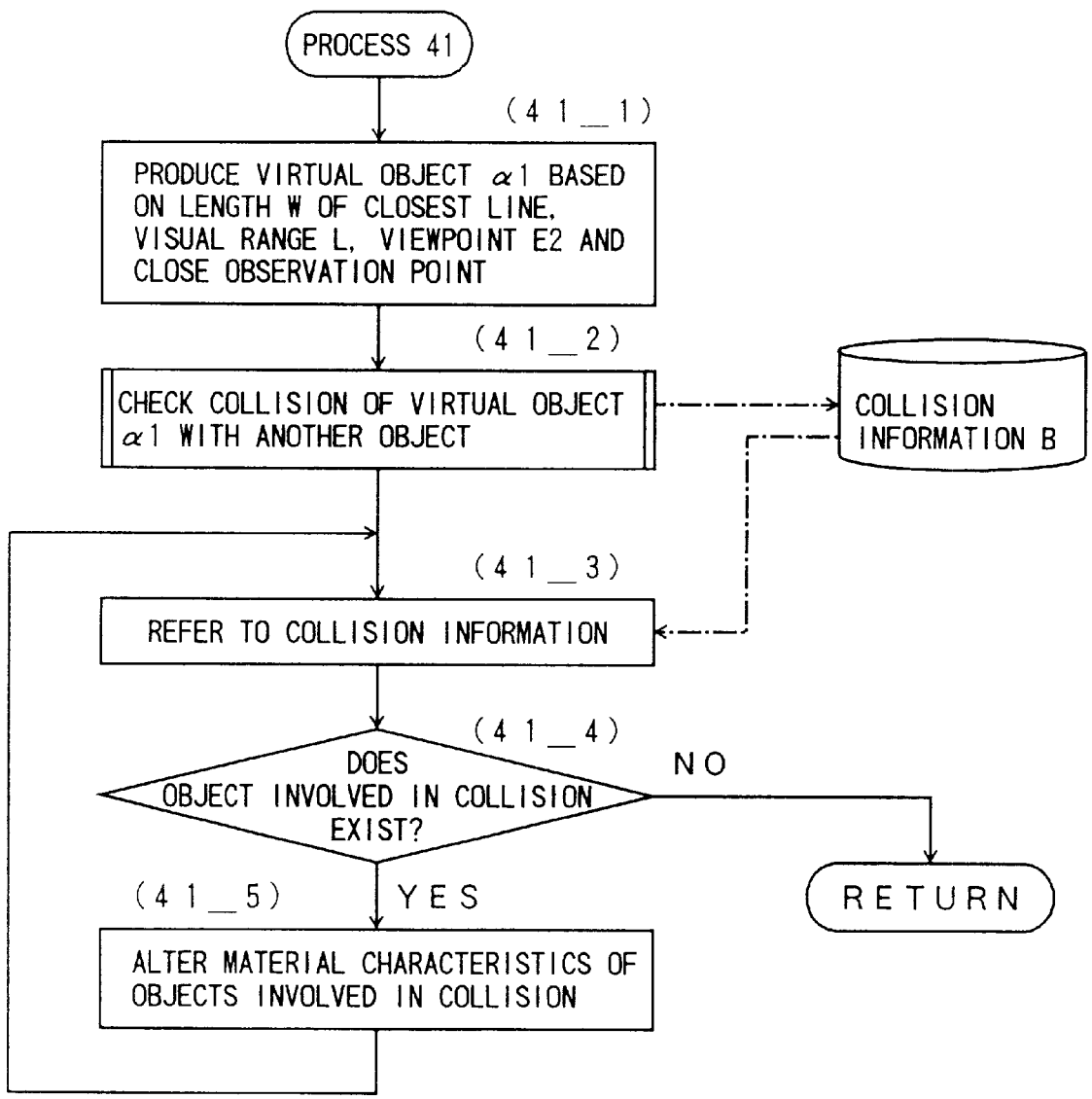
FIG. 13 is a flowchart of a routine for process 41.

FIG. 13 is a flowchart of a routine for process 41, which is performed in the step 1__8 in the routine for the process 1 shown in FIG. 5. The routine for process 41 is performed in the event that it is decided in the step M__8 in the main routine shown FIG. 4 that no collision occurs between objects, and also in the event that it is decided in the step 1__6 in the routine for the process 1 shown FIG. 5 that it is indicated that the object group is displayed on a semitransparent display basis. According to the present embodiment, there are prepared two routines for the process 41 and the process 42 as the routine for the semitransparent display of objects, and it is determined as to which one of those two routines is to be executed in accordance with the mode flag ModeFlag. The routine for process 41 shown in FIG. 13 is performed when the mode flag ModeFlag is 1. The mode flag ModeFlag is set up to 1 in the event that the viewpoint is not altered (the step 1__5 in FIG. 5), alternatively, in the event that the viewpoint is altered in such a manner that the movement of the viewpoint becomes minimum (the steps 3__5, 3__7 in FIG. 6). Here, it is supposed that the process 3 is performed in the step 1__4 in the process 1 shown in FIG. 5, so that the viewpoint is altered in such a manner that the movement of the viewpoint becomes minimum, in the routine for process 3 shown in FIG. 6.

Figure 14:
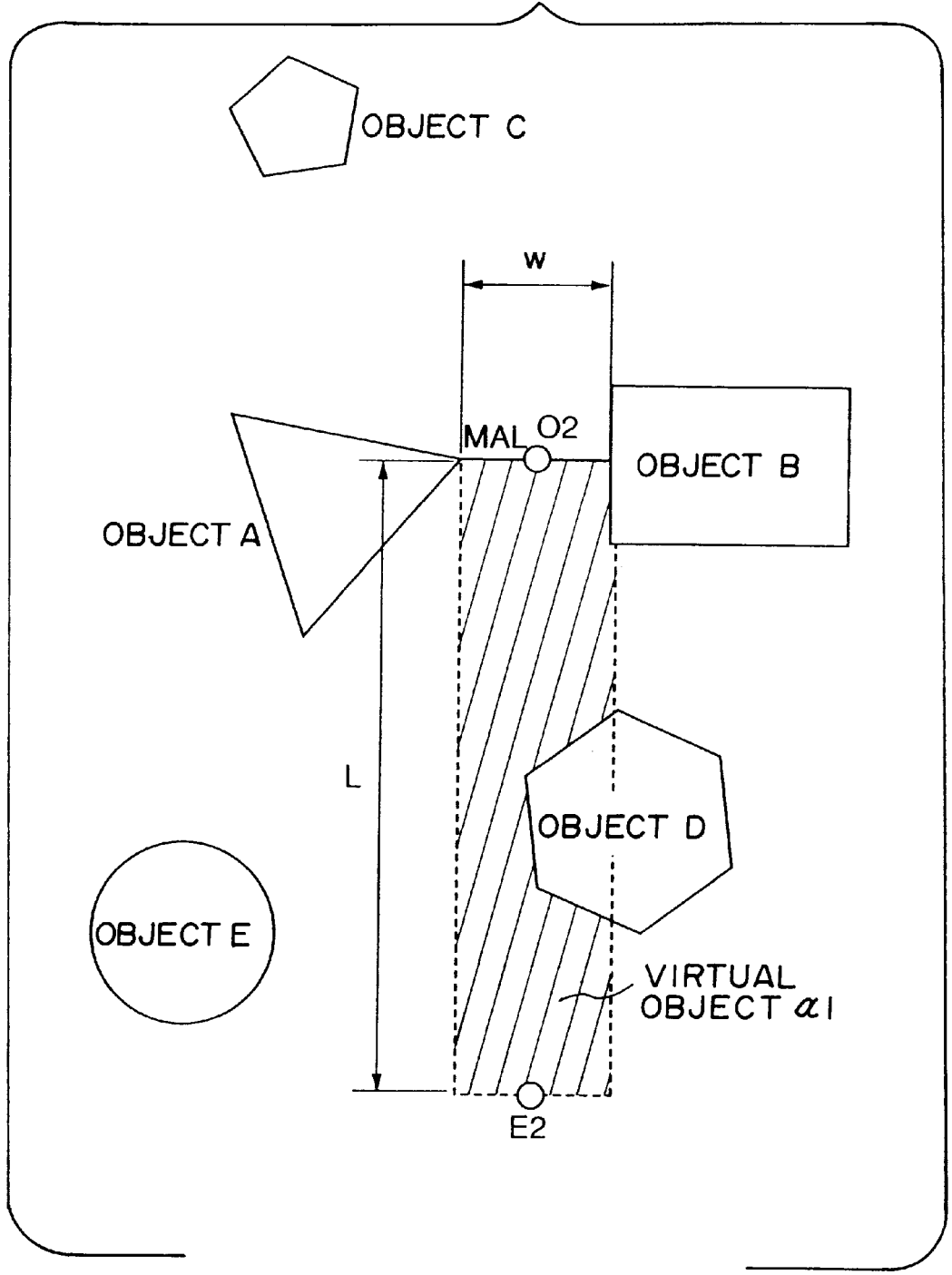
FIG. 14 is an explanatory view useful for understanding the routine for process 41 shown in FIG. 13, and also a plan view showing a state that five objects A, B, C, D and E are disposed in a virtual three-dimensional space.
Figure 15:
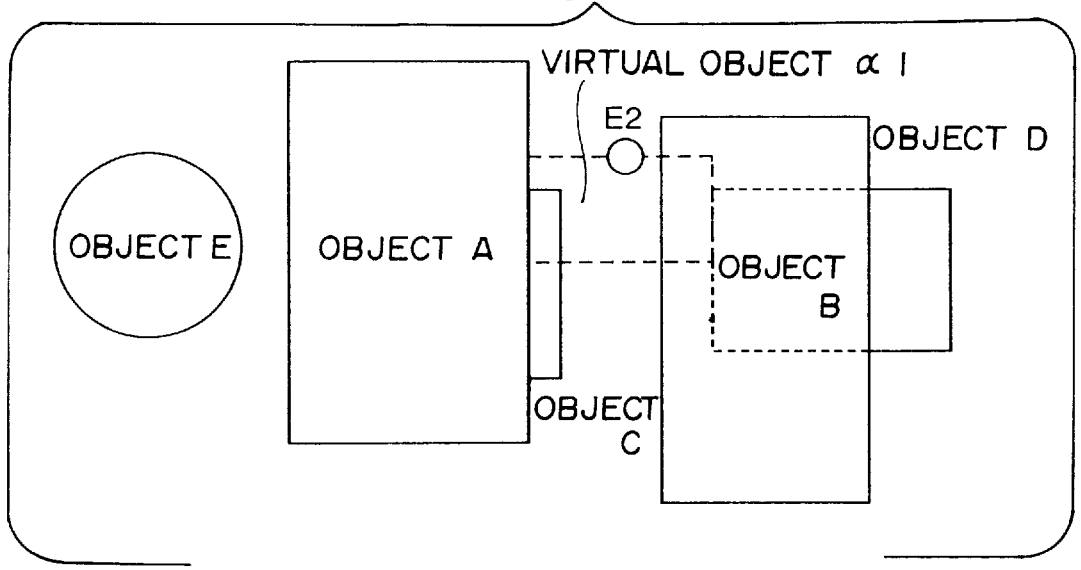
FIG. 15 is an explanatory view useful for understanding the routine for process 41 shown in FIG. 13, and also a front view showing a state that five objects A, B,C, D and E are disposed in a virtual three-dimensional space.

FIG. 14 is an explanatory view useful for understanding the routine for process 41 shown in FIG. 13, and also a plan view showing a state that five objects A, B, C, D and E are disposed in a virtual three-dimensional space. FIG. 15 is an explanatory view useful for understanding the routine for process 41 shown in FIG. 13, and also a front view showing a state that five objects A, B,C, D and E are disposed in a virtual three-dimensional space;

In a step 41__1 of the process 41 shown in FIG. 13, a rectangular shape of virtual object α1 shown in FIG. 14 and FIG. 15 is produced on the basis of a length W of the closest line MAL, a visual range L, a viewpoint E2 and a close observation point 02, as shown in FIG. 14 and FIG. 15. In a step 41__2, a collision check of the virtual object α1 thus obtained with another object is performed to generate collision information (cf. Table 2), and the collision information is temporarily stored in the storage unit.

In a step 41__3, the collision information is referred to, and in a step 41__4, it is determined whether there exists an object involved in a collision. When it is decided that there exists an object involved in a collision, the material characteristics of the object involved in a collision is altered to a semitransparent one. What is meant by the semitransparent one is that there is provided such a processing that while one's own self is clearly displayed, the inside of the semi-transparent object, or an object existing behind the semi-transparent object can be seen through the semitransparent object in some extent.

According to the example shown in FIGS. 14 and 15, in the event that the material characteristics of an object D is altered to a semitransparent one, and a close observation point 02 is looked at from a viewpoint E2, while a part of the closest line MAL is located behind the object D, the existence of the closest line MAL can be visually recognized through the semitransparent object D.

In a step 41__5, when the material characteristics of the object involved in a collision is altered, the process returns to the step 41__3. Referring to the collision information B, it is determined whether there exists an object involved in a collision, beside the object altered in the material characteristics to the semitransparent one. When it is decided that there exists further an object involved in a collision, a semitransparency-placing processing is practiced on the object involved in a collision in a similar fashion to that of the above-mentioned one. When the semitransparency-placing processing is practiced on all the objects involved in a collision, the process goes by the routine for process 41, and returns to the routine for process 1 shown in FIG. 5 and also goes by the routine for process 1 shown in FIG. 5, and further goes to the step M__11 of the main routine shown in FIG. 4 to produce a three-dimensional image.

Figure 16:
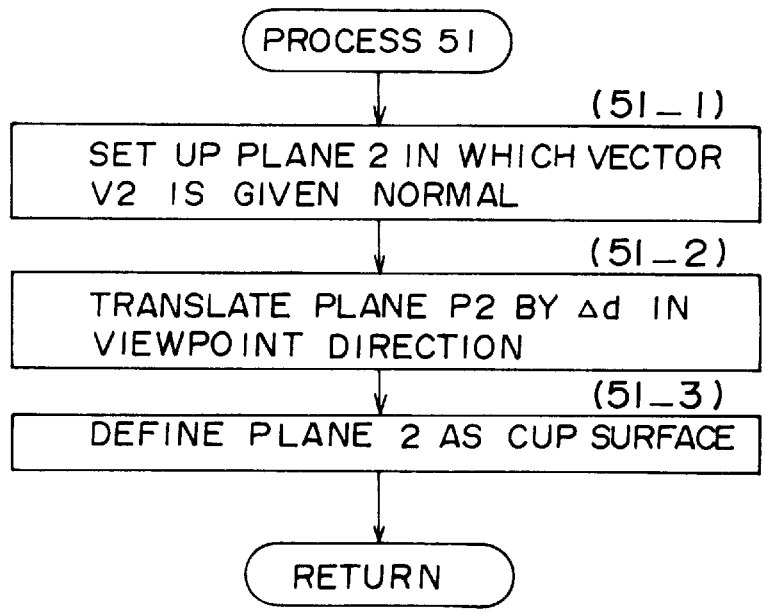
FIG. 16 is a flowchart of a routine for process 51.

FIG. 16 is a flowchart of a routine for process 51 to be performed in the step 1__12 of the routine for process 1 shown in FIG. 5. The routine for process 51 is performed in the event that it is decided in the step M__8 in the main routine shown FIG. 4 that no collision occurs between objects, and also in the event that it is decided in the step 1__10 in the routine for the process 1 shown FIG. 5 that it is indicated that the object group is displayed on a non-display basis. According to the present embodiment, there are prepared two routines for the process 51 and the process 52 as the routine for the non-display for the object group, and it is determined as to which one of those two routines is to be executed in accordance with the mode flag ModeFlag. The routine shown in FIG. 16 is performed when the mode flag ModeFlag is 1. The mode flag ModeFlag is set up to 1, as explained in connection with the routine for process 41 shown in FIG. 13, in the event that the viewpoint is not altered (the step 1_5 in FIG. 5), alternatively, in the event that the viewpoint is altered in such a manner that the movement of the viewpoint becomes minimum (the steps 3_5, 3_7 in FIG. 6). Here, in a similar fashion to that of the routine for process 41 shown in FIG. 13, it is supposed that the process 3 is performed in the step 1_4 in the process 1 shown in FIG. 5, so that the viewpoint is altered in such a manner that the movement of the viewpoint becomes minimum, in the routine for process 3 shown in FIG. 6.

Figure 17:
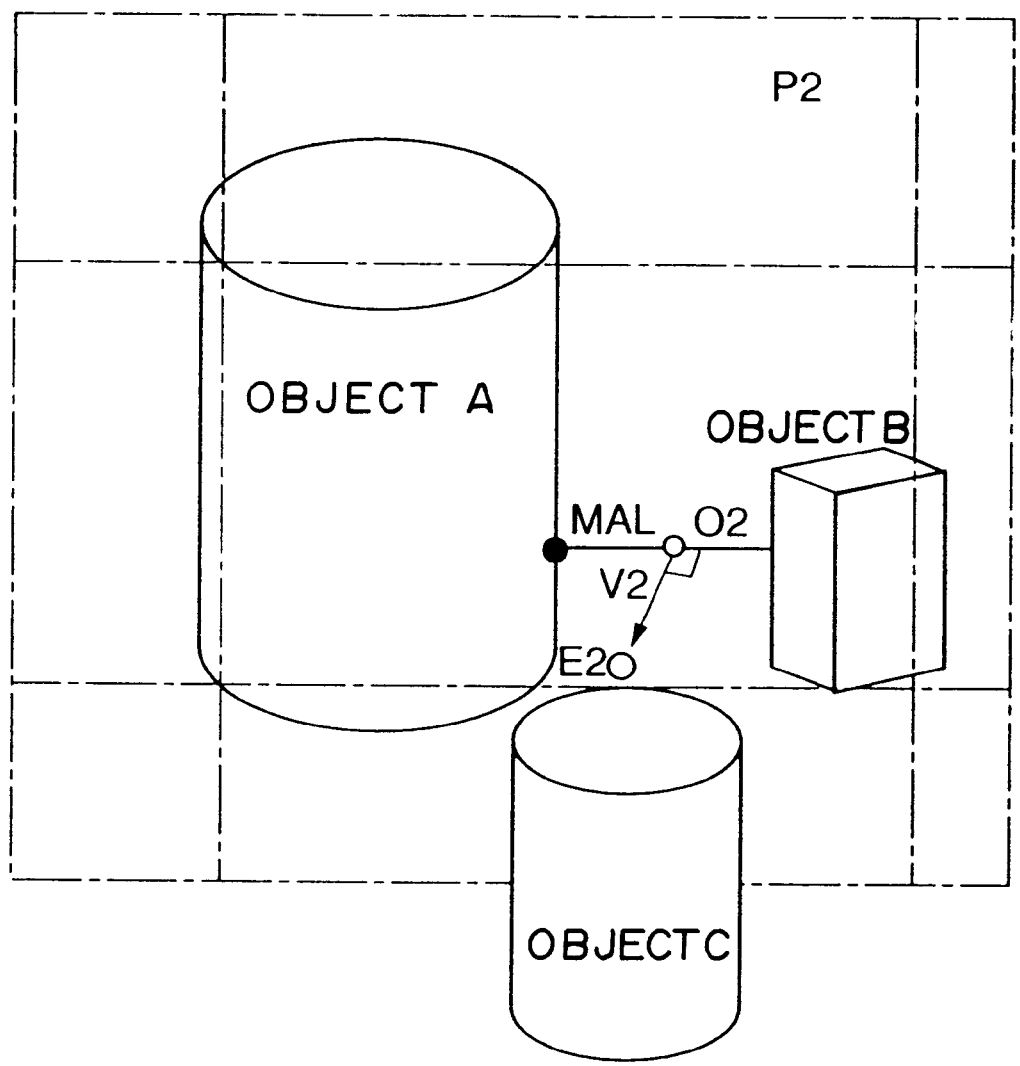
FIG. 17 is an explanatory view useful for understanding the routine for process 51 shown in FIG. 16, and also a perspective view showing a state that three objects A, B and C are disposed in a virtual three-dimensional space.
Figure 18:
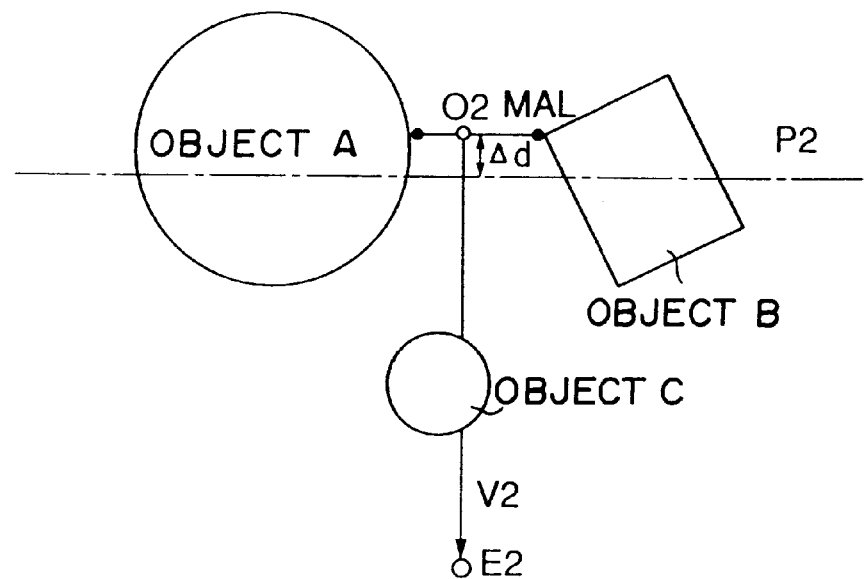
FIG. 18 is an explanatory view useful for understanding the routine for process 51 shown in FIG. 16, and also a plan view showing a state that three objects A, B and C are disposed in a virtual three-dimensional space.

FIG. 17 is an explanatory view useful for understanding the routine for process 51 shown in FIG. 16, and also a perspective view showing a state that three objects A, B and C are disposed in a virtual three-dimensional space. FIG. 18 is an explanatory view useful for understanding the routine for process 51 shown in FIG. 16, and also a plan view showing a state that three objects A, B and C are disposed in a virtual three-dimensional space.

Figure 19:
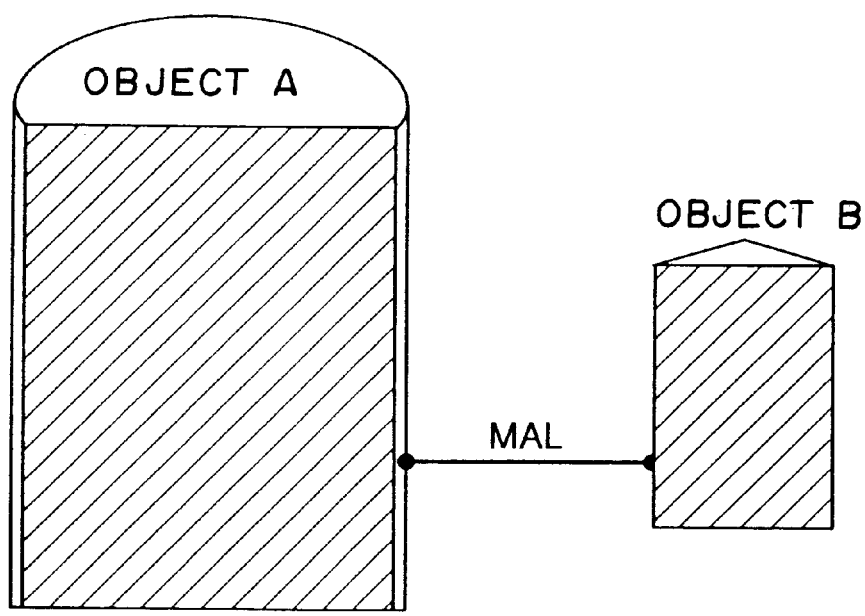
FIG. 19 is a typical illustration showing a result after execution of the routine for process 51 shown in FIG. 16.

FIG. 19 is a typical illustration showing a result after execution of the routine for process 51 shown in FIG. 16.

In a step 51_1 for process 51 shown in FIG. 16, as shown in FIG. 17, a plane P2 including the closest line MAL, where a vector V2 extending from a close observation point 02, which is located at the center of the closest line MAL, to a viewpoint E2 is given as a normal, is set up. In a step 51_2, the plane P2 is translated by a predetermined distance Δd in a direction of the viewpoint E2 (cf. FIG. 18). In a step 51_3, the plane P2 after a movement is defined as a clip surface, and an object or a part of the object, which is located at the viewpoint E2 side with respect to the plane P2, is displayed on a non-display basis. Specifically, according to the example shown in FIG. 18, an object C is non-displayed, and parts of objects A and B, which are located at the viewpoint E2 side with respect to the plane P2, are cut off and non-displayed. As a result, as shown in FIG. 19, parts of the objects A and B, which are located farther than the plane P2 looking from the viewpoint E2, and the closest line MAL are displayed. This makes it possible to surely visually recognize the closest line MAL.

Figure 20:
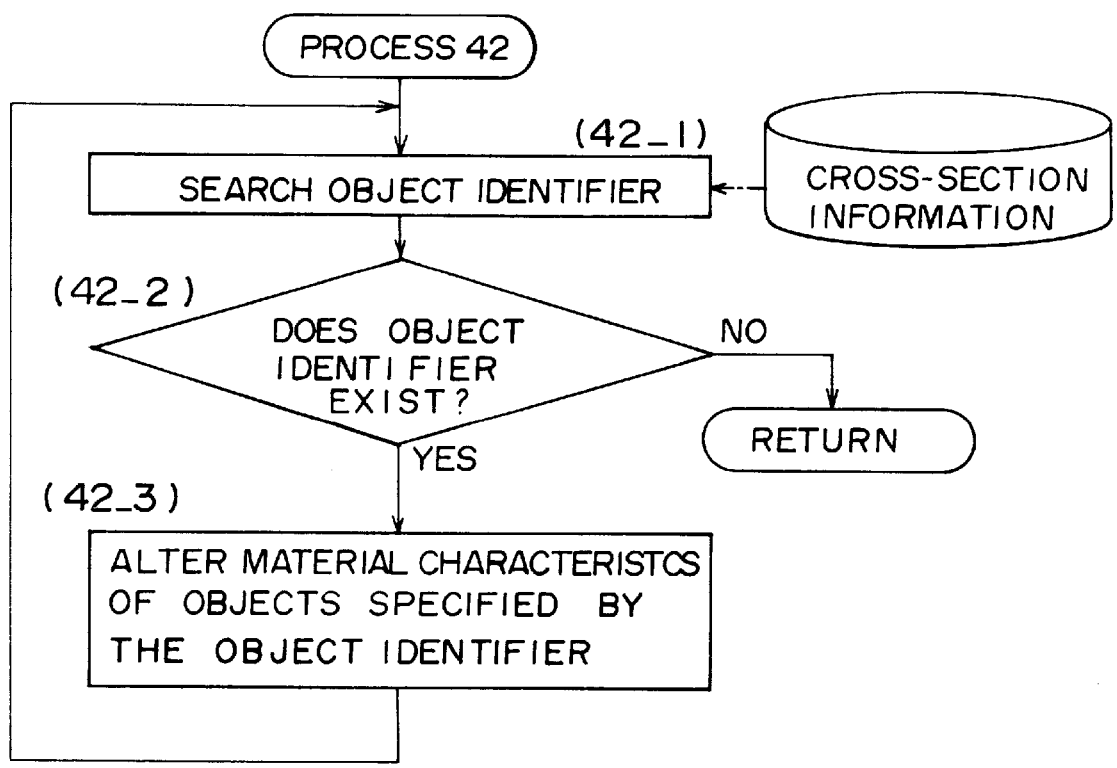
FIG. 20 is a flowchart of a routine for process 42.

FIG. 20 is a flowchart of a routine for process 42 which is performed in the step 1_9 of the routine for process 1 shown in FIG. 5. The process 42 is, similar to the process 41 shown in FIG. 13, one of the processings for placing into a semitransparency an object which is an obstacle to an observation for the closest line. This is a routine when ModeFlag=0. The ModeFlag is set up to 0 in the event that in the routine for process 3 shown in FIG. 6, a mode wherein the viewpoint is altered to the position at which an object putting the closest line out of sight becomes minimum is executed (steps 3_6, 3_14 in FIG. 6).

In the routine for process 42 shown in FIG. 20, first, in a step 42_1, it is retrieved as to whether an object identifier associated with an angle θ (cf. the step 3_13 in FIG. 6) in which the viewpoint E2 is set up exists in the cross-section information stored in the storage unit in the step 3_8 of the process 3 shown in FIG. 6. The object identifier for the retrieval object is an identifier for an object which interrupts the closest line MAL looking toward the closest line MAL at the viewpoint E2 set up in the step 3_13 of the process 3 shown in FIG. 6.

In a step 42_2, it is determined as to whether an identifier of the object which interrupts the closest line MAL exists. When it is decided that the identifier exists, the material characteristics of the object specified by the identifier is altered to a semitransparent one in a step 42_3. These steps 42_1 to 42_3 are repeated by the number of objects which interrupt the closest line MAL in the visual field.

In the manner as mentioned above, according to the process 42, objects which interrupt the closest line MAL in the visual field are retrieved on the basis of the cross-section information stored in the storage unit in the step 3_8 of the process 3 shown in FIG. 6, so that the objects thus detected are altered in material to the semitransparent one.

Figure 21:
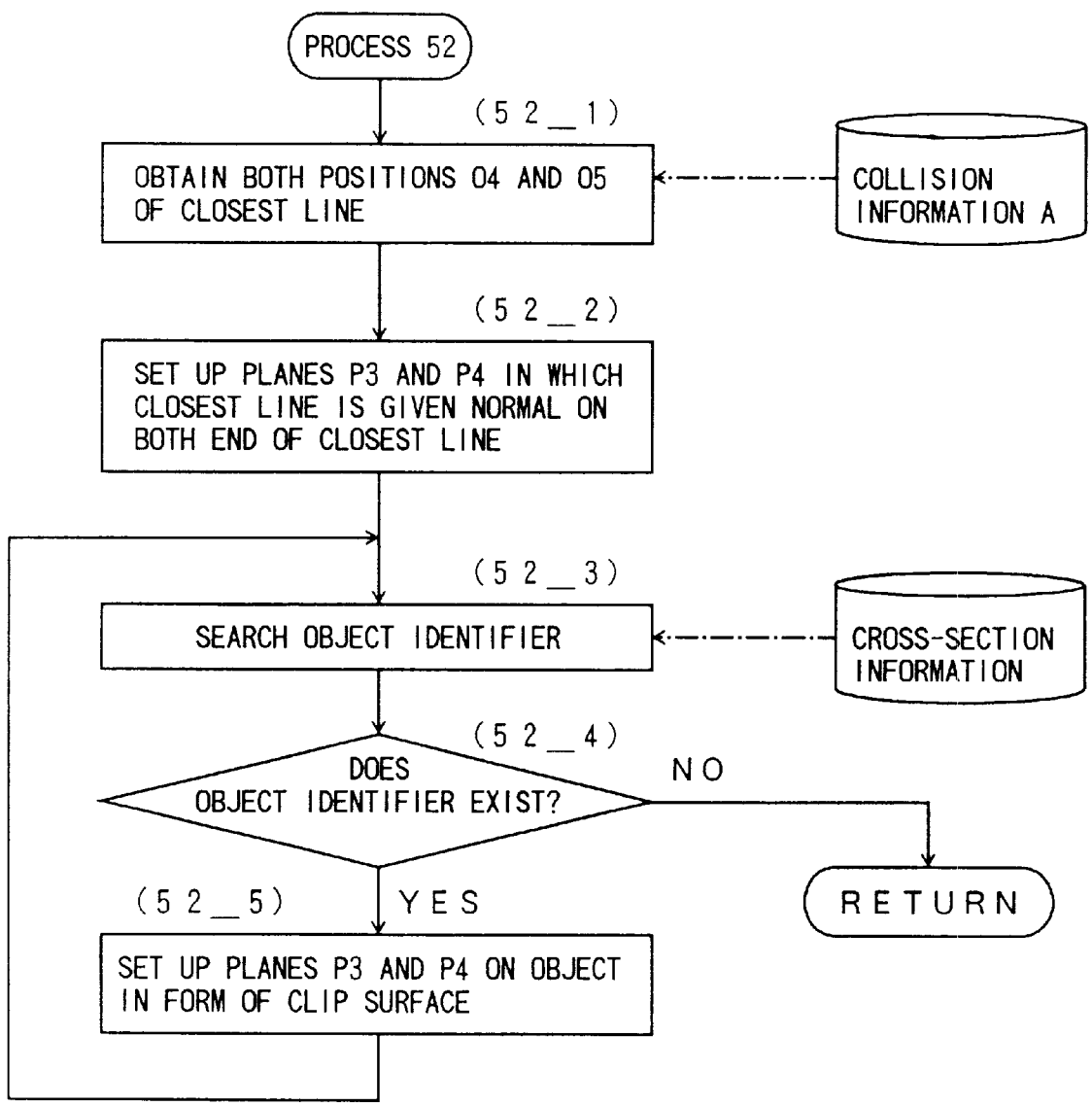
FIG. 21 is a flowchart of a routine for process 52.

FIG. 21 is a flowchart of a routine for process 52 which is performed in the step 1_13 of the routine for process 1 shown in FIG. 5. The process 52 is, similar to the process 51 shown in FIG. 16, one of the processings for placing into a non-display an object which is an obstacle to an observation for the closest line. This is a routine when ModeFlag=0. The ModeFlag is set up to 0, as described in connection with the process 42 shown in FIG. 20, in the event that in the routine for process 3 shown in FIG. 6, a mode wherein the viewpoint is altered to the position at which an object putting the closest line out of sight becomes minimum is executed (steps 3_6, 3_14 in FIG. 6).

Figure 22:
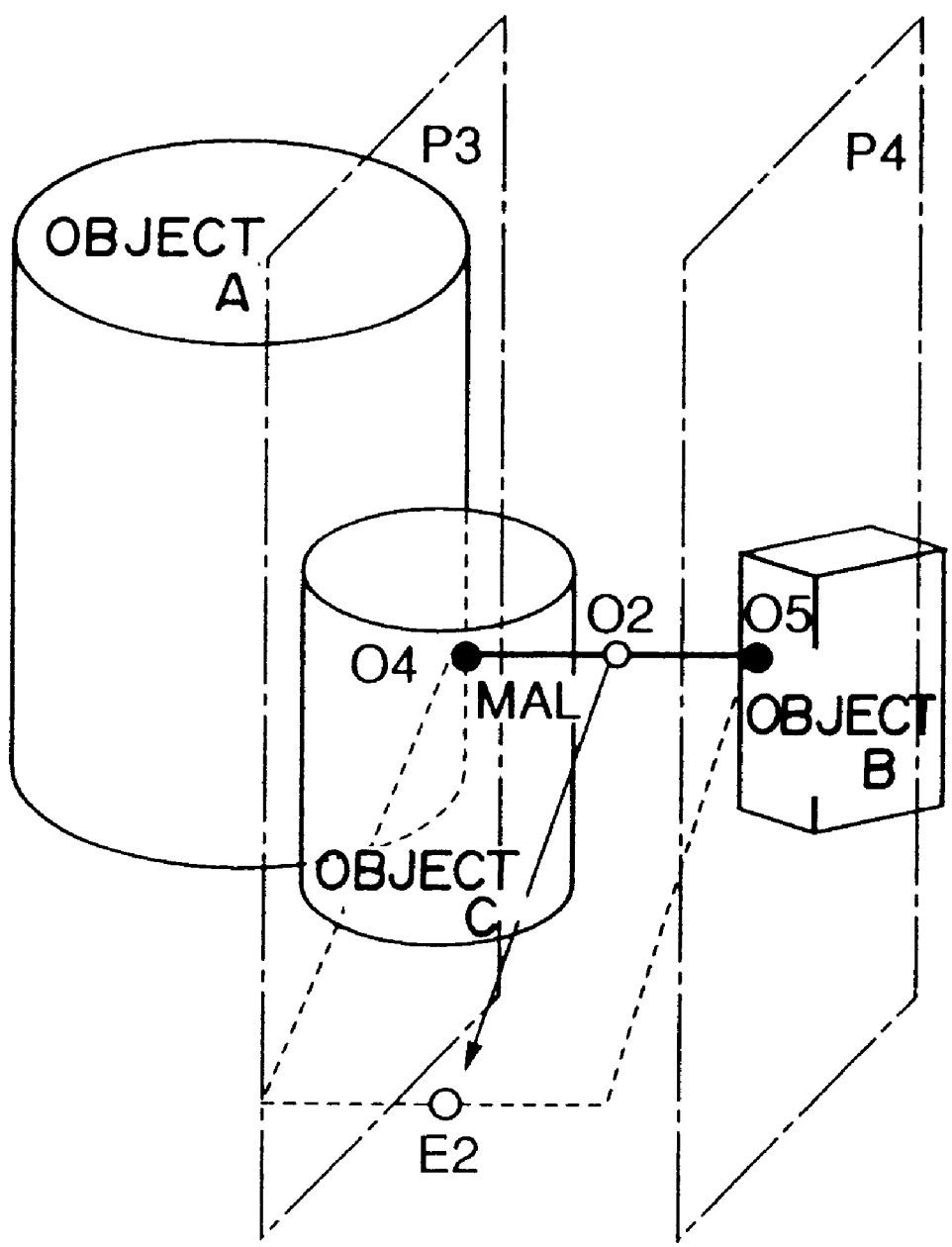
FIG. 22 is an explanatory view useful for understanding the routine for process 52 shown in FIG. 21, and also a perspective view showing a state that three objects A, B and C are disposed in a virtual three-dimensional space.
Figure 23:
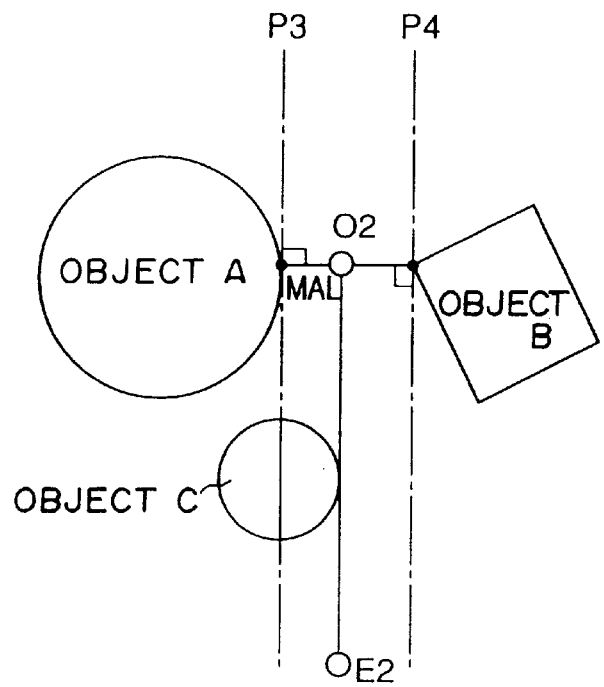
FIG. 23 is an explanatory view useful for understanding the routine for process 51 shown in FIG. 21, and also a plan view showing a state that three objects A, B and C are disposed in a virtual three-dimensional space.

FIG. 22 is an explanatory view useful for understanding the routine for process 52 shown in FIG. 21, and also a perspective view showing a state that three objects A, B and C are disposed in a virtual three-dimensional space. FIG. 23 is an explanatory view useful for understanding the routine for process 51 shown in FIG. 21, and also a plan view showing a state that three objects A, B and C are disposed in a virtual three-dimensional space.

Figure 24:
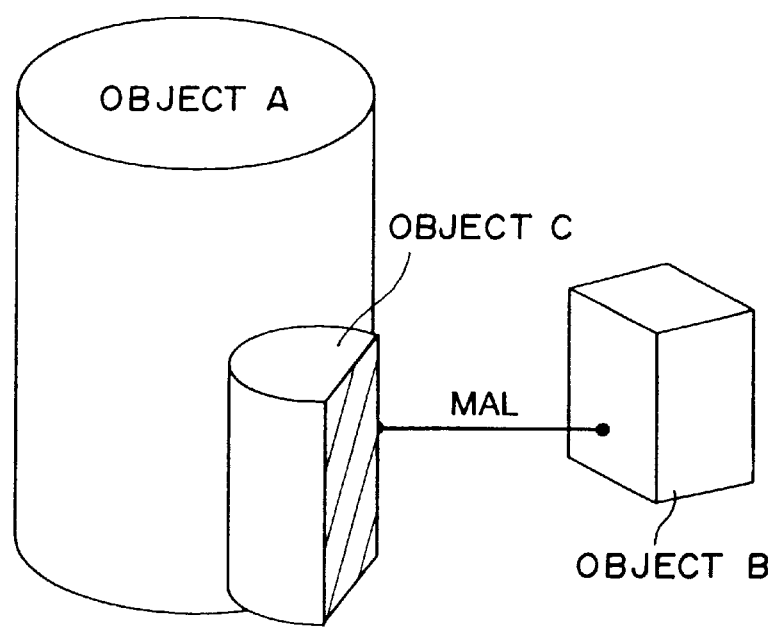
FIG. 24 is a typical illustration showing a result after execution of the routine for process 52 shown in FIG. 21.

FIG. 24 is a typical illustration showing a result after execution of the routine for process 52 shown in FIG. 21.

In a step 52_1 of the process 52 shown in FIG. 21, the collision information (cf. Table 2), which is determined in the step M_7 of the main routine shown in FIG. 4 and stored in the storage unit, is referred to so as to obtain position information 04, 05 of the both ends (closest points) of the closest line. In a step 52_2, as shown in FIGS. 22 and 23, there are set up two planes P3 and P4 in which the closest line is given as a normal, including the closest points 04 and 05, respectively.

Next, in a step 52_3, it is retrieved as to whether an object identifier associated with an angle θ (cf. the step 3_13 in FIG. 6) in which the viewpoint E2 is set up exists in the cross-section information stored in the storage unit in the step 3_8 of the process 3 shown in FIG. 6. The object identifier for the retrieval object is an identifier for an object which interrupts the closest line MAL looking toward the closest line MAL at the viewpoint E2 set up in the step 3_13 of the process 3 shown in FIG. 6.

In a step 52_4, it is determined as to whether an identifier of the object which interrupts the closest line MAL exists. When it is decided that the identifier exists, in a step 52_5, two planes P3 and P4 are set up in the form of clip surfaces on the object specified by the identifier, and a portion of an area defined by these two planes P3 and P4 of the object is non-displayed. These steps 52_3 to 52_5 are repeated by the number of objects which interrupt the closest line MAL in the visual field.

As a result of this process, as seen in FIG. 24, it is possible to have an unobstructed view for the closest line MAL.

Figure 25:
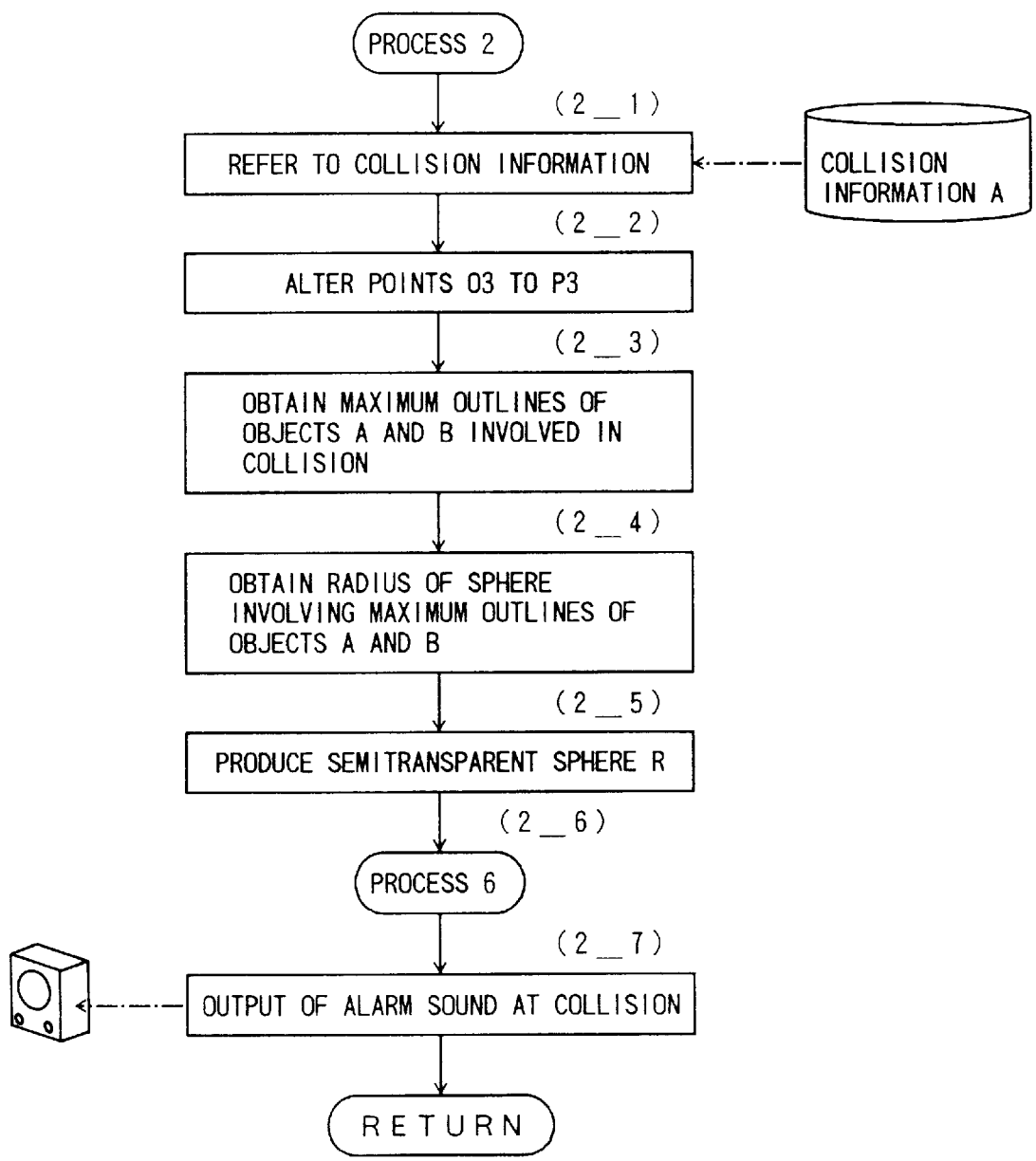
FIG. 25 is a flowchart of a routine for process 2.

FIG. 25 is a flowchart of a routine for process 2 which is performed in the step M_10 of the main routine shown in FIG. 4. The routine for process 2 is executed in the event that in the step M_8 of the main routine shown in FIG. 4 it is decided that a collision occurs between objects.

Figure 26:
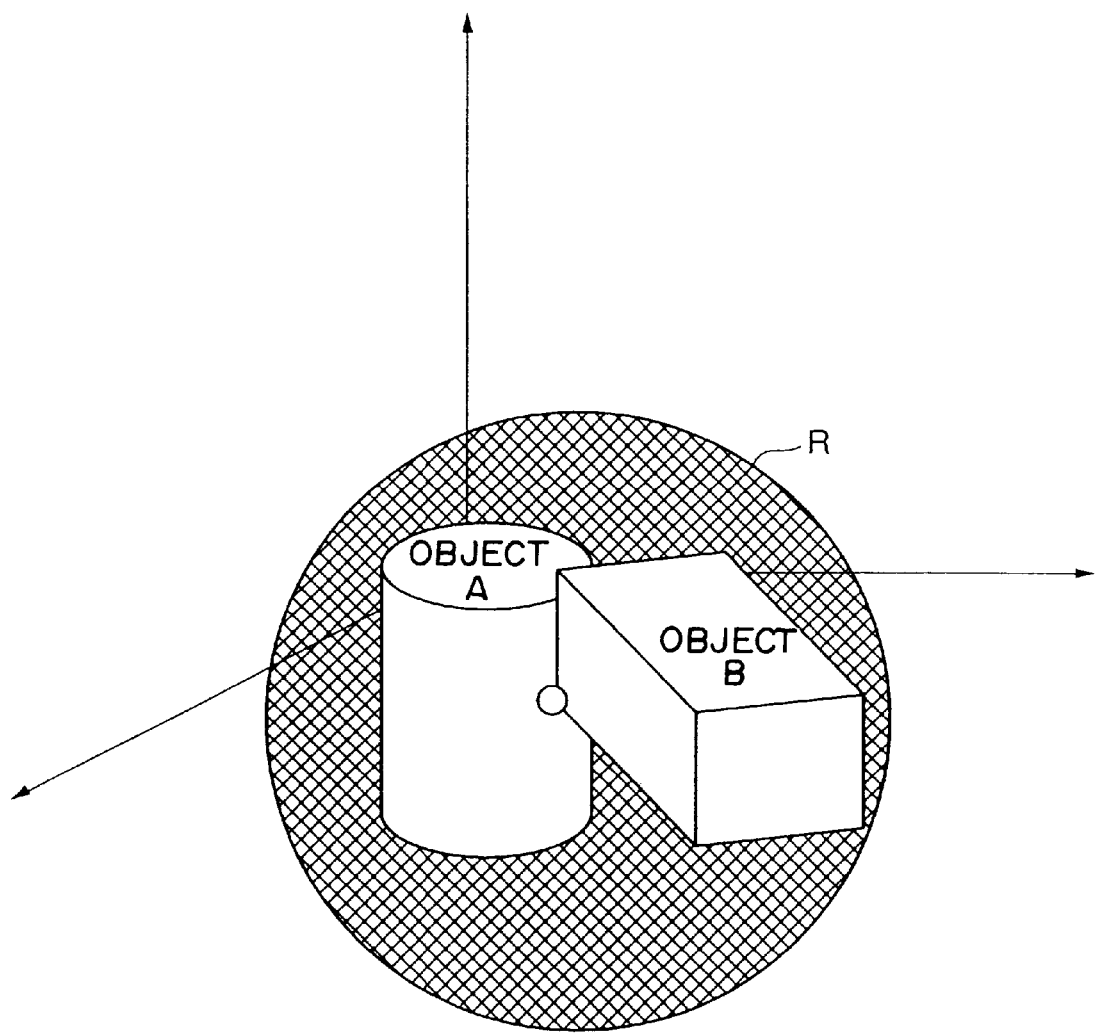
FIG. 26 is an explanatory view useful for understanding the routine for process 2.

FIG. 26 is an explanatory view useful for understanding the routine for process 2 shown in FIG. 25, and shows the state that objects A and B, which collide with each other, exist in a virtual three-dimensional space, and are enveloped in a semitransparent sphere R.

In the routine for process 2 shown in FIG. 25, first, the collision information, which is determined in the step M_7 of the main routine shown in FIG. 4 and stored in the storage unit, is referred to so as to obtain a collision point P3 (step 2_1). Next, in a step 2_2, a close observation point 03 is altered to the collision point P3. In a step 2_3, maximum outlines of the objects A and B involved in collision are obtained. In a step 2_4, a radius of the sphere having the maximum radius involving the maximum outlines of the objects A and B on the close observation point 03 is obtained. In a step 2_5, the semitransparent sphere R having such a radius is produced. The semitransparent sphere R is a sort of a mark indicating that the collision point P3 exists at its center. Thus, it is possible to easily find the collision point P3 on the basis of the semitransparent sphere R on the displayed three-dimensional image.

Next, in a step 2_6, a process 6 is performed. While details of the process 6 will be described later, in a similar fashion to that of the above-mentioned closest line, in the step 2_6, there are performed a semitransparency-placing processing and a non-display processing for objects which interrupt the visibility of the collision point.

In a step 2_7, there is outputted an alarm sound indicative of an occurrence of a collision, and then the process returns to the main routine shown in FIG. 4 in which in the step M_11, a three-dimensional image is produced, and in the step M_12, the three-dimensional image thus produced is displayed.

Figure 27:
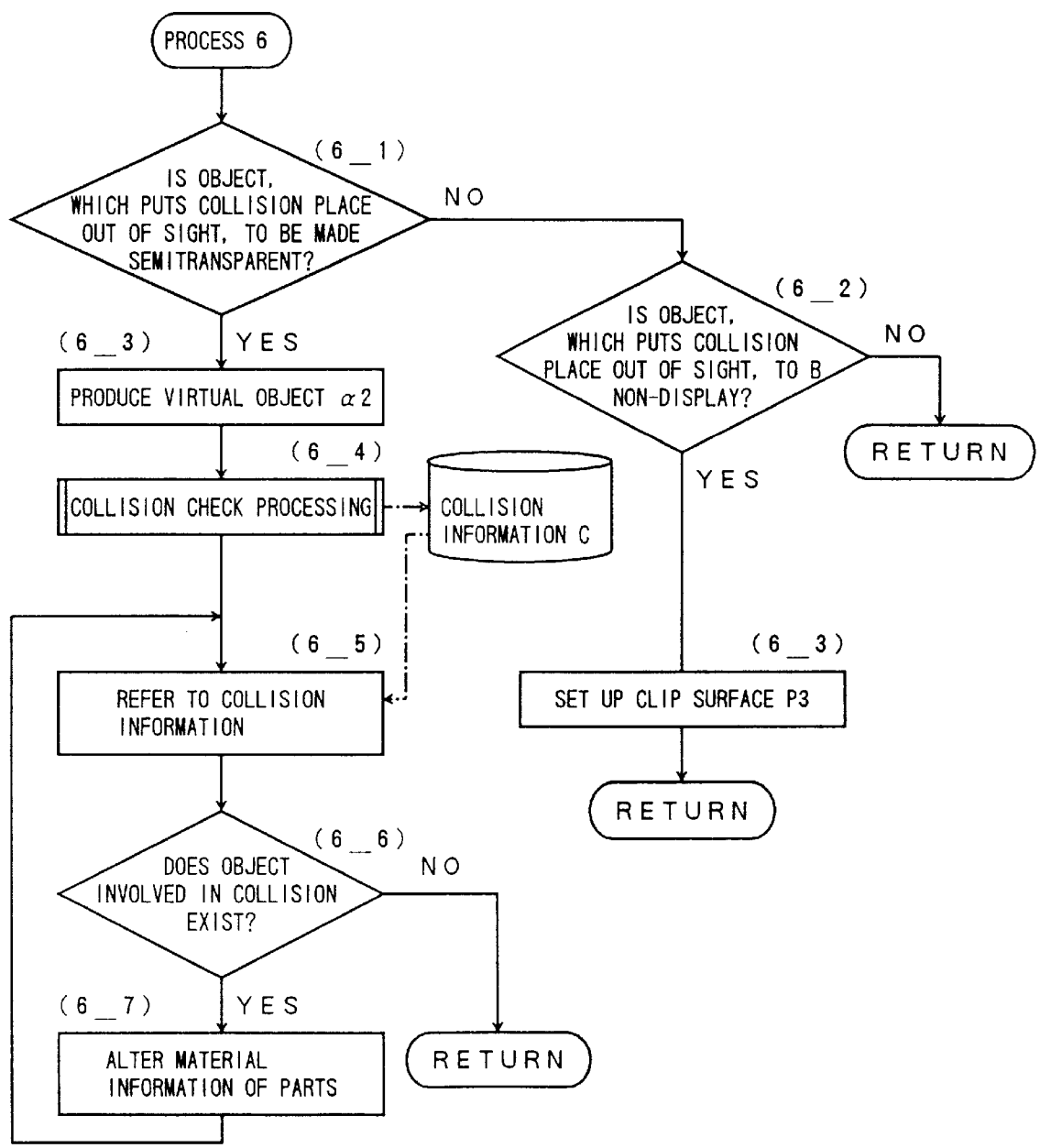
FIG. 27 is a flowchart of a routine for process 6.

FIG. 27 is a flowchart of a routine for process 6 which is performed in the step 2_6 of process 2 shown in FIG. 25.

Figure 28:
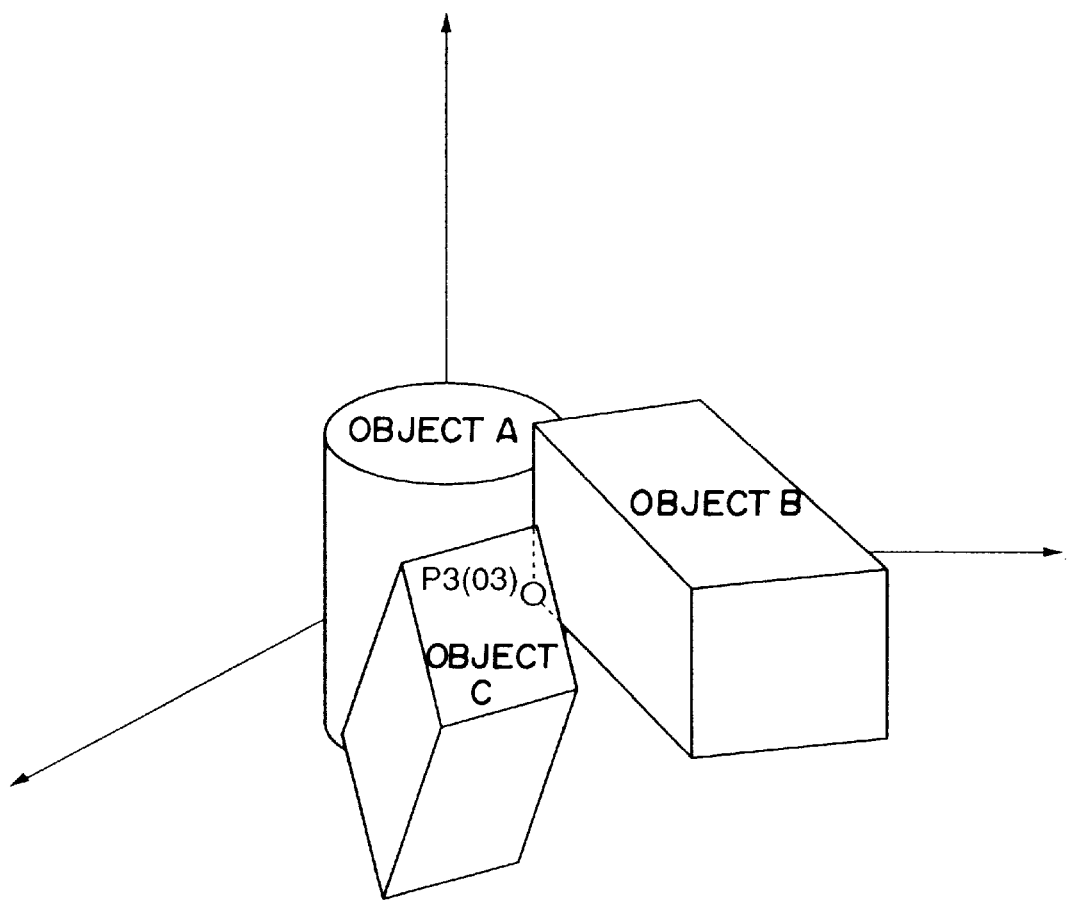
FIGS. 28—33 are explanatory views each useful for understanding the routine for process 6.
Figure 29:
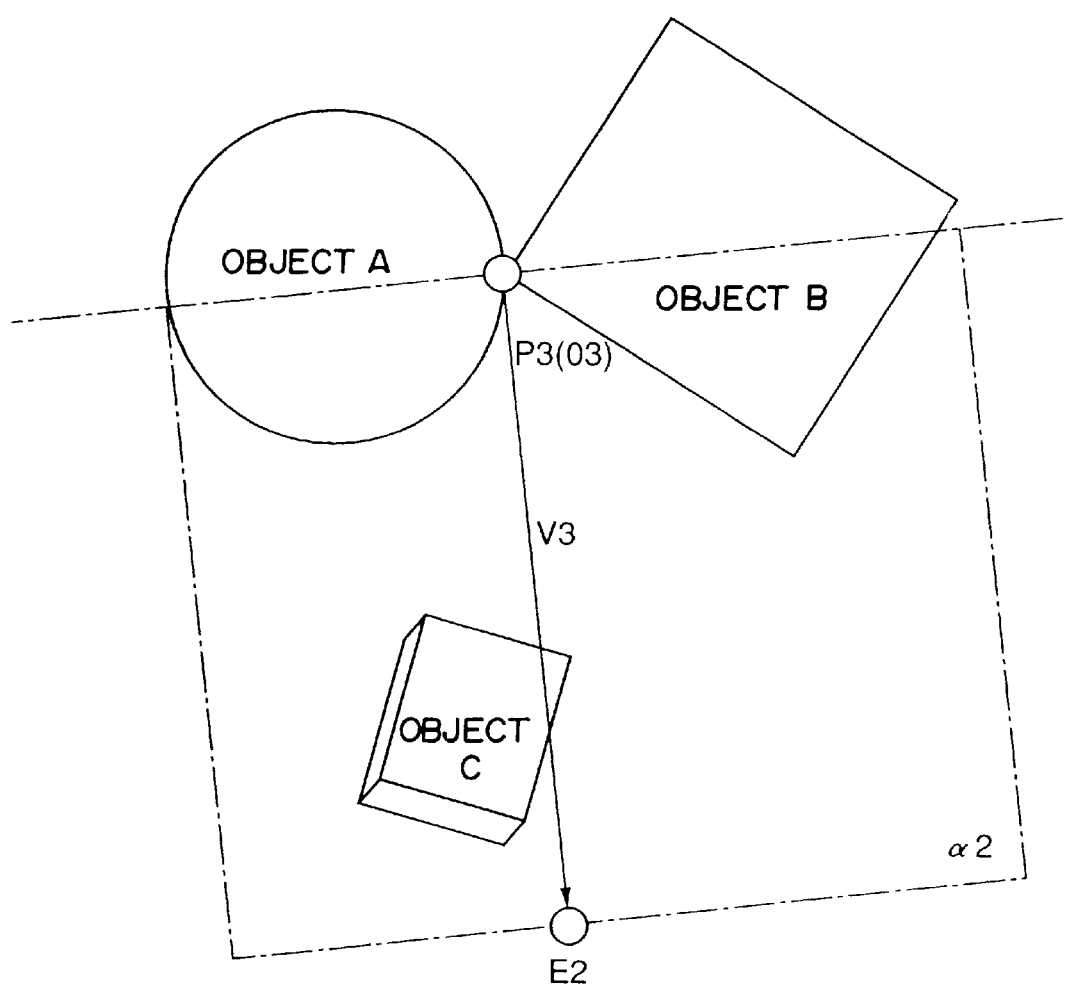

FIGS. 28–33 are explanatory views each useful for understanding the routine for process 6 shown in FIG. 27. FIGS. 28 and 29 are a perspective view and a plan view, respectively, each showing the state that three objects A, B and C are disposed in a virtual three-dimensional space. Here, the objects A and B collide with each other, and a collision point P3 (a close observation point 03) is visually interrupted by the object C looking toward the collision point P3 (the close observation point 03) at a viewpoint E2, and thus the collision point P3 (the close observation point 03) cannot be visually recognized.

Figure 30:
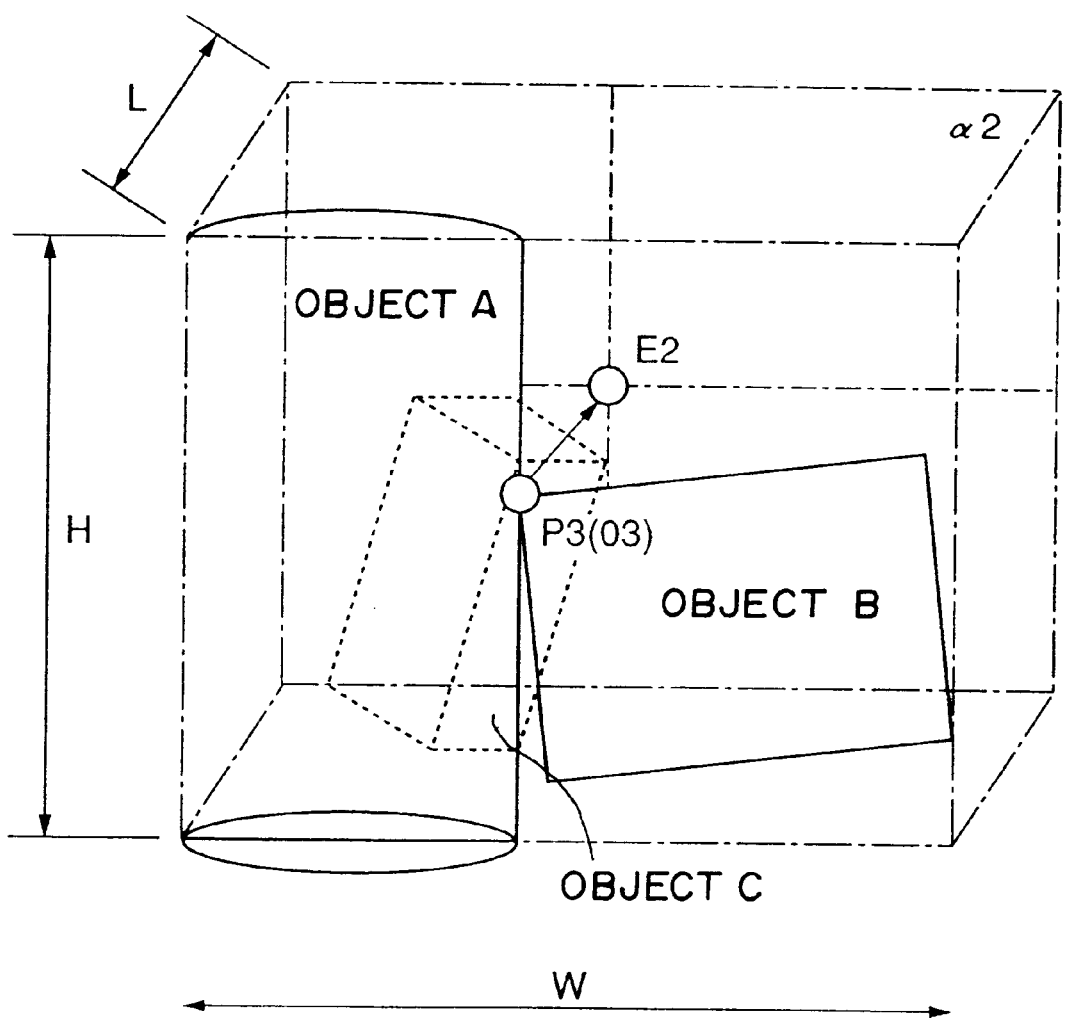

FIG. 30 is a plan view showing a state that the object C is placed in a semitransparency and thus the collision point P3 (the close observation point 03) can be visually recognized through the object C.

Figure 31:
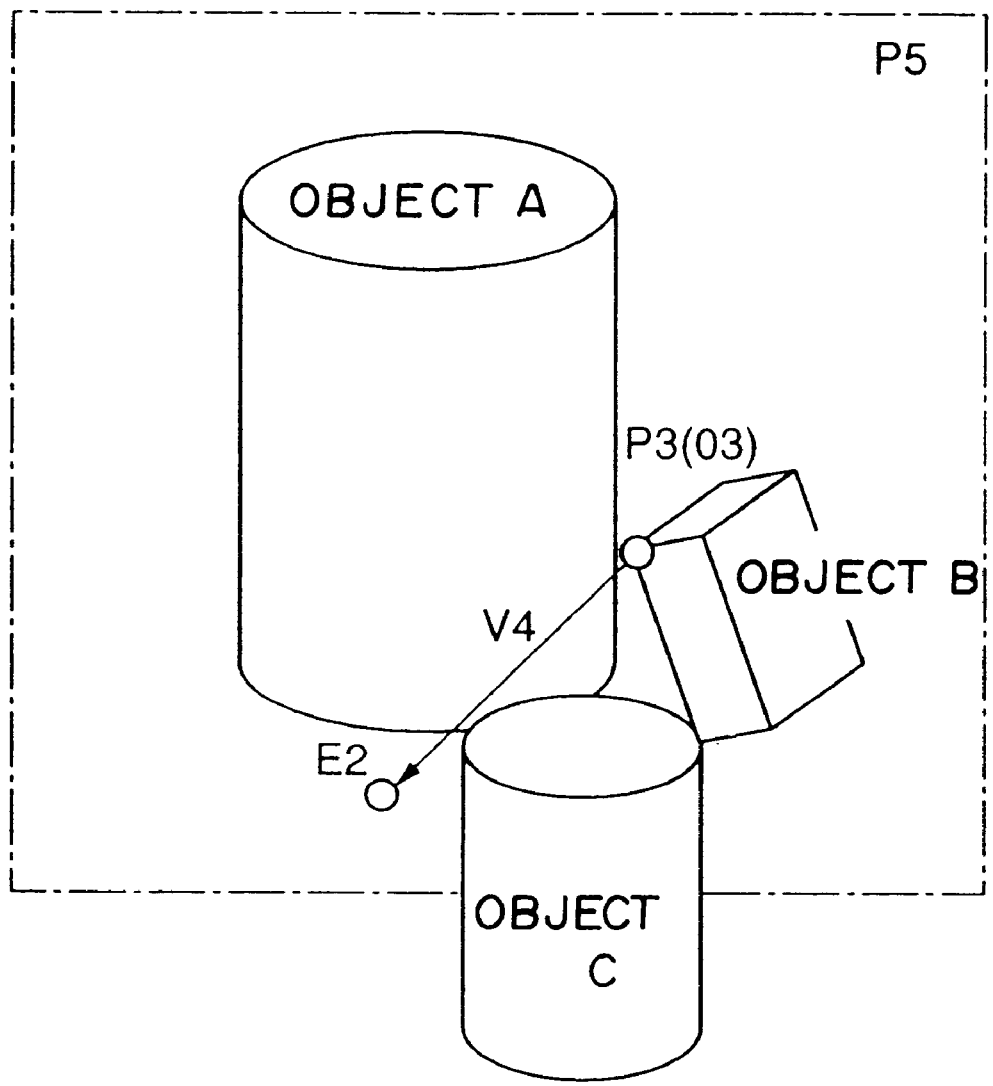
Figure 32:
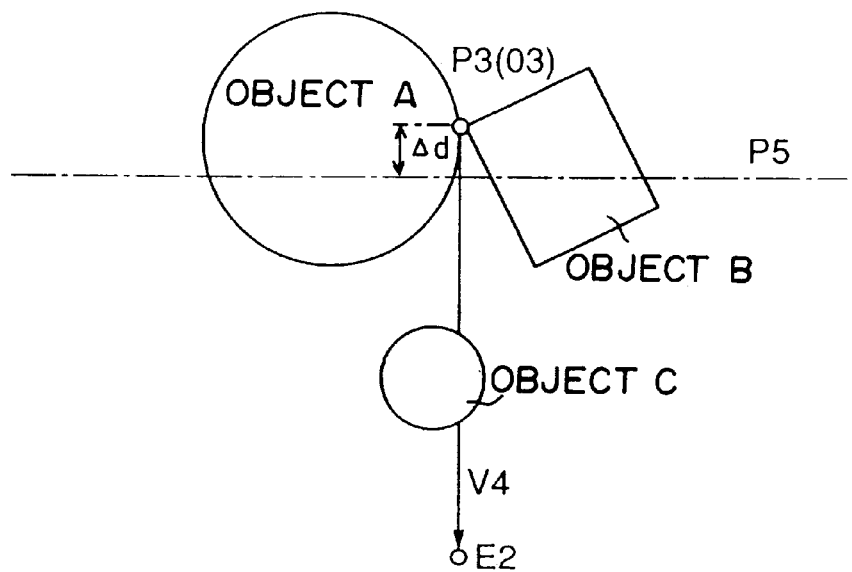
Figure 33:
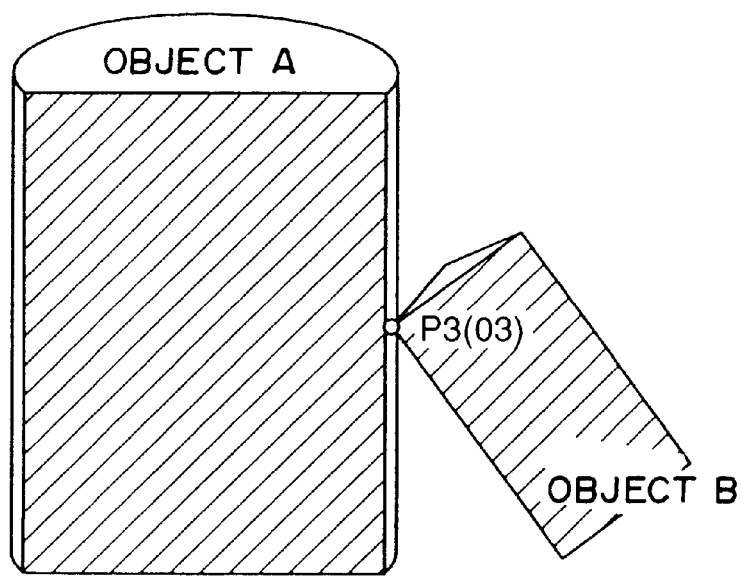
Figure 34:
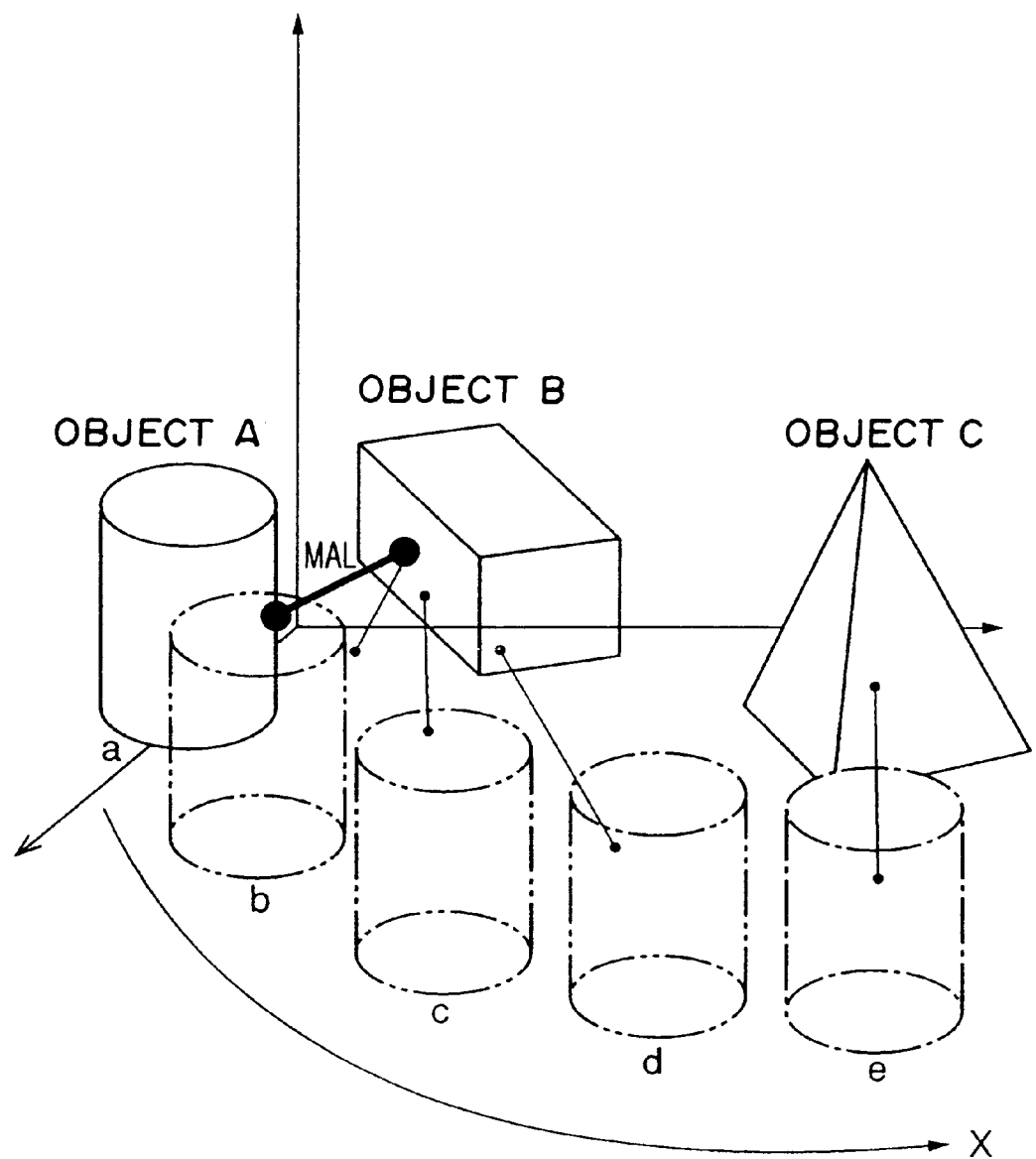
FIG. 34 is an explanatory view useful for understanding the movement simulation.
Figure 35A:
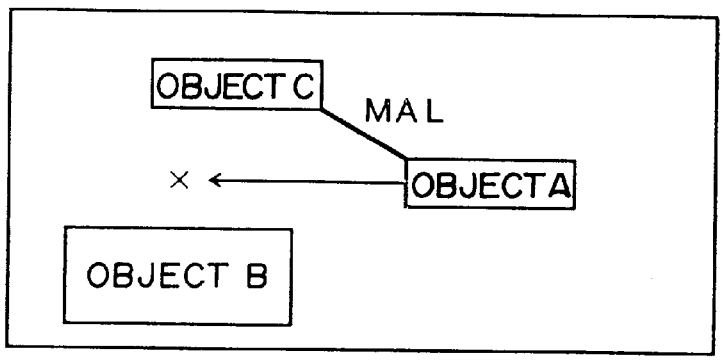
FIGS. 35(A) and 35(B) are typical illustrations each showing the manner in which the closest line disappears in the object, those figures being concerned with the state before movement.
Figure 35B:
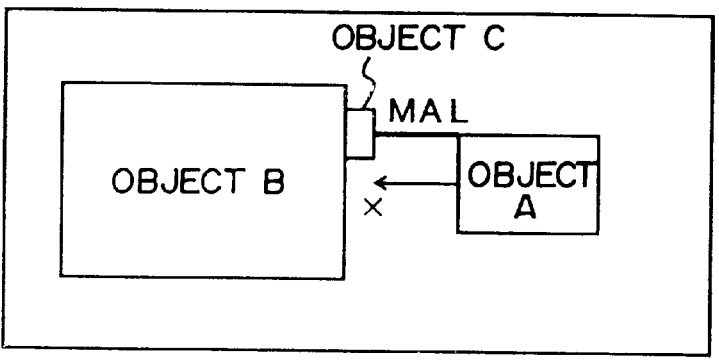
Figure 36A:
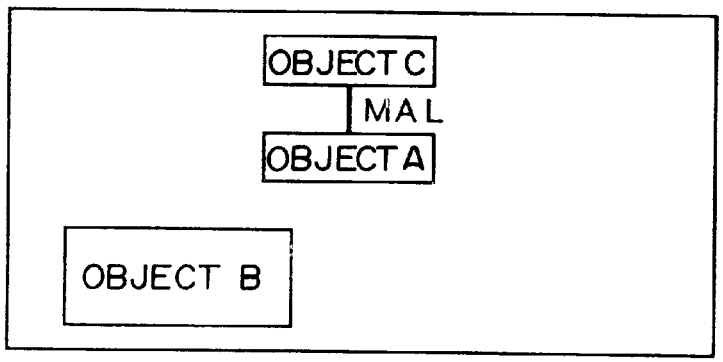
FIGS. 36(A) and 36(B) are typical illustrations each showing the manner in which the closest line disappears in the object, those figures being concerned with the state after movement.
Figure 36B:
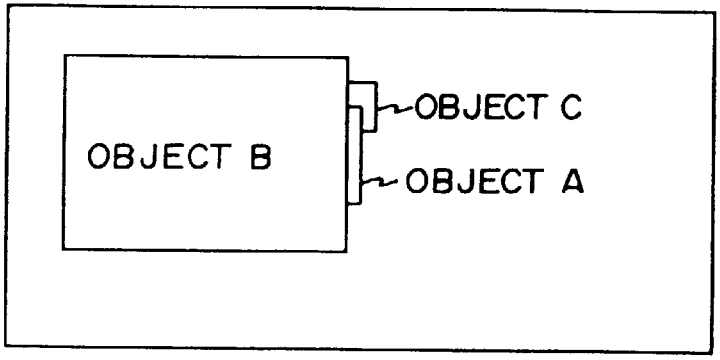

FIGS. 31 and 32 are, similar to FIGS. 28 and 29, a perspective view and a plan view, respectively, each showing the state that three objects A, B and C are disposed in a virtual three-dimensional space. Here, the objects A and B collide with each other, and a collision point P3 is visually interrupted by the object C looking toward the collision point P3 at a viewpoint E2, and thus the collision point P3 cannot be visually recognized. FIG. 33 is a view showing a three-dimensional image in the state that the object C is non-displayed, and respective portions of the objects A and B are non-displayed, so that the collision point P3 (the close observation point 03) can be visually recognized.

In a step 6_1 of the routine for process 6 shown in FIG. 27, it is determined whether an object, which puts the collision place out of sight, is given semitransparent. In a step 6_2, it is determined whether an object, which puts the collision place out of sight, is to be non-displayed. With respect to determinations as to whether an object, which puts the collision place out of sight, is given semitransparent, or alternatively whether an object, which puts the collision place out of sight, is to be non-displayed, it is inputted in the form of an instruction beforehand by an operator of the computer system 10 (cf. FIG. 2), and the instruction thus inputted is stored inside the computer system 10 in the form of a flag. In the steps 6_1 and 6_2, the determinations are made in accordance with the flag thus stored. In the event that both the instruction that an object, which puts the collision place out of sight, is given semitransparent, and the instruction that an object, which puts the collision place out of sight, is to be non-displayed are made, the instruction that an object, which puts the collision place out of sight, is given semitransparent has a priority. On the other hand, in the event that none of these instructions is made, nothing is done in the routine for process 6 shown in FIG. 27, and the process goes by the routine for process 6 and the program proceeds to the step 2_7 of the routine for process 2 shown in FIG. 25.

In the step 6_1, when it is decided that it is instructed that an object, which puts the collision place out of sight, is given semitransparent, the process goes to a step 6_3 in which a virtual object α2 as shown in FIGS. 29 and 30 is produced. The virtual object α2 is defined by a side parallel to a straight line coupling the collision point P3 (the close observation point 03) with the viewpoint E2, and a vertical side with respect to the same straight line, and is a rectangular parallelepiped surrounded by height H and width W of a cube including the two objects involved in a collision, and a visual range L.

In a step 6_4, there is performed a collision check processing among the virtual object α2 thus produced and each of the objects, and collision information (cf. Table 2) obtained through the collision check processing is temporarily stored in the storage unit.

Next, referring to the collision information (a step 6_5), it is determined whether there exists an object which collides with the virtual object α2 (a step 6_6). When it is decided that there exists an object which collides with the virtual object α2, the material characteristics of the object involved in a collision is altered to a semitransparent one (a step 6_7).

According to the examples shown in FIGS. 28 to 30, the material characteristics of the object C is altered to a semitransparent one, and as a result, when looking toward the collision point P3 (the close observation point 03) at the viewpoint E2, it is possible to visually recognize the object C through the collision point P3 (the close observation point 03).

In the step 6_7, when the material characteristics of the object involved in a collision is altered to a semitransparent one, the process returns to the step 6_5 in which it is confirmed whether there exists an object, which collides with the virtual object α2, beside the object which is altered in the material characteristics to the semitransparent one. When it is decided that there still remains an object involved in a collision, the semitransparency-placing processing is applied to the object involved in a collision in a similar fashion to that of the previous object. When all of the objects, which collide with the virtual object α2, are placed to the semitransparency, the process goes by the routine for process 6, and the program proceeds to the step 2_7 shown in FIG. 25, in which an alarm sound emanates. Further, the program proceeds to the step M_11 of the main routine shown in FIG. 4, in which a three-dimensional image is produced. In the step M_12, the three-dimensional image thus produced is displayed.

In the step 6_1 of the routine for process 6 shown in FIG. 27, when it is decided that it is not instructed that an object, which puts the collision place out of sight, is given semitransparent, the process goes to a step 6_2 in which it is determined whether there exists an instruction that the object, which puts the collision place out of sight, is non-displayed. When it is decided that there exists an instruction that the object, which puts the collision place out of sight, is non-displayed, the process goes to a step 6_3.

In the step 6_3, as shown in FIGS. 31 and 32, there is set up a plane P5 in which a vector V4, which passes through the collision point P3 (the close observation point 03) and extends from the collision point P3 (the close observation point 03) toward the viewpoint E2, is given as a normal; the plane P5 is moved by a predetermined distance Δd to the viewpoint E2 side; the plane P5 thus moved is defined as the clip surface; and objects and parts of objects, which are located at the viewpoint E2 side with respect to the clip surface, are non-displayed. Specifically, according to the example shown in FIGS. 31 to 33, an object C is non-displayed, and parts of objects A and B, which are located at the viewpoint E2 side with respect to the clip surface, are non-displayed. As a result, in the step M_11 of the routine shown in FIG. 4, there is produced a three-dimensional image as shown in FIG. 33. In the step M_11, the three-dimensional image thus produced is displayed.

This makes it possible to surely visually recognize the collision point.

As mentioned above, according to the present invention, it is possible to implement an object movement simulation apparatus capable of displaying three-dimensional images in which the closest line and the collision point are easy to see.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An object movement apparatus, comprising:
a collision arithmetic unit performing arithmetic including a detection of two closest points in accordance with information representative of a plurality of objects, among an object of interest of any one of the plurality of objects and other objects except the object of interest, said two closest points consisting of a closest point on a closest object located closest to the object of interest with respect to the object of interest, and a closest point on the object of interest with respect to the closest object; and
an image producing unit producing a three-dimensional image including a virtual object representative of a closest line coupling the two closest points to each other in response to movement of one of the plurality of objects,
wherein said image producing produces the three-dimensional image by changing the viewpoint from a first viewpoint before the movement to a second viewpoint after the movement such that the second viewpoint is determined by passing a plane normal to the closest line through a mid-point of the closest line, by forming a line normal to the plane and connecting the plane to the first viewpoint, and by defining the second viewpoint at a point on a line connecting the midpoint and the point of connection of the line normal to the plane.

2. An object movement apparatus, comprising:
a collision arithmetic unit performing arithmetic including a detection of two closest points in accordance with information representative of a plurality of objects, among an object of interest of any one of the plurality of objects and other objects except the object of interest, said two closest points consisting of a closest point on a closest object located closest to the object of interest with respect to the object of interest, and a closest point on the object of interest with respect to the closest object; and
an image producing unit producing a three-dimensional image including a virtual object representative of a closest line coupling the two closest points to each other in response to movement of one of the plurality of objects,
wherein said image producing unit produces the three-dimensional image by changing to a viewpoint determined by passing a plane normal to the closest line through a mid-point of the closest line, by forming a line normal to the plane and connecting the plane to the first viewpoint, and by defining the changed viewpoint at a point on a line connecting the midpoint and the point of connection of the line normal to the plane.

3. An object movement apparatus, comprising:
a collision arithmetic unit performing arithmetic including a detection of two closest points in accordance with information representative of a plurality of objects, among an object of interest of any one of the plurality of objects and other objects except the object of interest, said two closest points consisting of a closest point on a closest object located closest to the object of interest with respect to the object of interest, and a closest point on the object of interest with respect to the closest object; and
an image producing unit producing a three-dimensional image including a virtual object representative of a closest line coupling the two closest points to each other in response to movement of one of the plurality of objects,
wherein said image producing unit produces the three-dimensional image by displaying the object of interest and the closest object in a semitransparency-placing process such that overlapping portions are displayed with a mixed color.

4. An object movement apparatus, comprising:
a collision arithmetic unit performing arithmetic including a detection of two closest points in accordance with information representative of a plurality of objects, among an object of interest of any one of the plurality of objects and other objects except the object of interest, said two closest points consisting of a closest point on a closest object located closest to the object of interest with respect to the object of interest, and a closest point on the object of interest with respect to the closest object; and
an image producing unit producing a three-dimensional image including a virtual object representative of a closest line coupling the two closest points to each other in response to movement of one of the plurality of objects,
wherein said image producing unit produces the three-dimensional image by changing the viewpoint from a first viewpoint before the movement to a second viewpoint after the movement, and in which an object which interrupts the virtual object representative of the closest line is non-displayed in at least a part of the interruption.

5. An object movement apparatus according to claim 4, wherein said image producing unit produces three-dimensional images in which with respect to a direction along eyes looking toward the virtual object representative of the closest line, an object or a part of the object, which is located at this side of the virtual object, is non-displayed.

6. An object movement apparatus according to claim 4, wherein said image producing unit produces three-dimensional images in which an object or a part of the object, which is located in a space defined by two planes expanding along eyes looking the virtual object representative of the closest line, the virtual object being interposed between the two planes, is non-displayed.

7. An object movement apparatus according to claim 4, wherein said image producing unit produces three-dimensional images in which a semitransparency-placing processing is applied to objects which interrupt the collision point.

8. An object movement apparatus according to claim 4, wherein said image producing unit produces three-dimensional images in which an object, which interrupts the collision point, is non-displayed in at least part interrupting the collision point.

9. An object movement apparatus, comprising:

a collision arithmetic unit detecting closest points of a plurality of displayed objects of interest, a first closest point being on a closest object to an object of interest, and a second closest point being on the object of interest and closest to the closest object; and an image producing unit producing a three-dimensional image including a virtual object representative of a closest line coupling the two closest points to each other in response to movement of one of the plurality of objects, wherein said image producing unit produces the three-dimensional image by changing an original viewpoint to a second viewpoint after the movement by passing a plane normal to the closest line through a mid-point of the closest line, by forming a line normal to the plane and connecting the plane to the original viewpoint, and by defining the second viewpoint at a point on a line connecting the midpoint and the point of connection of the line normal to the plane.

* * * * *